(12) United States Patent
Nelson

(10) Patent No.: US 10,994,421 B2
(45) Date of Patent: May 4, 2021

(54) SYSTEM AND METHOD FOR DYNAMIC ROBOT PROFILE CONFIGURATIONS BASED ON USER INTERACTIONS

(71) Applicant: DMAI, Inc., Los Angeles, CA (US)

(72) Inventor: Jeremy Nelson, Los Angeles, CA (US)

(73) Assignee: DMAI, INC., Los Angeles, CA (US)

( * ) Notice: Subject to any disclaimer, the term of this patent is extended or adjusted under 35 U.S.C. 154(b) by 36 days.

(21) Appl. No.: 16/233,986

(22) Filed: Dec. 27, 2018

(65) Prior Publication Data
US 2019/0248019 A1    Aug. 15, 2019

Related U.S. Application Data

(60) Provisional application No. 62/630,912, filed on Feb. 15, 2018.

(51) Int. Cl.
| | |
|---|---|
| *G10L 15/22* | (2006.01) |
| *B25J 11/00* | (2006.01) |
| *B25J 13/08* | (2006.01) |
| *B25J 9/16* | (2006.01) |
| *G06N 3/00* | (2006.01) |

(52) U.S. Cl.
CPC ......... *B25J 11/0015* (2013.01); *B25J 9/1697* (2013.01); *B25J 13/08* (2013.01); *G06N 3/008* (2013.01); *G10L 15/22* (2013.01); *G10L 15/222* (2013.01)

(58) Field of Classification Search
CPC ......... G10L 15/22; G10L 25/63; G10L 13/00; G10L 13/08; G10L 15/005; G10L 15/07; G10L 15/1807; G10L 15/1815; G10L 15/222; G10L 15/265; G10L 2015/227; B25J 11/0005; B25J 11/0015; B25J 11/009; B25J 9/0003; B25J 9/1694; G06F 19/3462; G06F 19/3481; G06F 3/011; G06F 3/017; G06F 40/20; G06F 40/205; G06F 50/56; G10H 10/20; G10H 10/60; G10H 20/10; G10H 20/13; G10H 20/40; G10H 20/70;
(Continued)

(56) References Cited

U.S. PATENT DOCUMENTS

| | | | |
|---|---|---|---|
| 9,381,426 B1 * | 7/2016 | Hughes | .................. H04L 67/06 |
| 2004/0148375 A1 | 7/2004 | Levett | |

(Continued)

OTHER PUBLICATIONS

International Search Report and Written Opinion dated Mar. 28, 2019 in International Application PCT/US2018/067690.
(Continued)

*Primary Examiner* — Vijay B Chawan
(74) *Attorney, Agent, or Firm* — Pillsbury Winthrop Shaw Pittman LLP

(57) ABSTRACT

The present teaching relates to method, system, medium, and implementations for configuring an animatronic device. Information about a user is obtained for whom an animatronic device is to be configured to carry out a dialogue with the user. One or more preferences of the user are identified from the obtained information and are used to select, from the plurality of selectable profiles, a first selected profile, which specifies parameters to be used to control a manner by which the animatronic device is to communicate with the user. The animatronic device is then configured based on the first selected profile for carrying out the dialogue in the manner specified.

21 Claims, 38 Drawing Sheets

(58) Field of Classification Search
CPC ........ G10H 40/63; G10H 50/20; G10H 50/50; G10H 70/40
USPC .............................. 704/270, 275, 270.1, 231
See application file for complete search history.

(56) References Cited

U.S. PATENT DOCUMENTS

| | | | |
|---|---|---|---|
| 2012/0212499 A1 | 8/2012 | Haddick | |
| 2013/0278631 A1 | 10/2013 | Border | |
| 2016/0055236 A1 | 2/2016 | Frank | |
| 2016/0300252 A1 | 10/2016 | Frank | |
| 2017/0148434 A1 | 5/2017 | Monceaux | |
| 2017/0228520 A1* | 8/2017 | Kidd | G06F 19/3481 |
| 2017/0352351 A1* | 12/2017 | Kimura | G10L 25/78 |
| 2017/0358296 A1* | 12/2017 | Segalis | H04M 3/58 |
| 2018/0075847 A1 | 3/2018 | Lee | |
| 2018/0307674 A1 | 10/2018 | Akkiraju | |
| 2019/0130904 A1 | 5/2019 | Homma | |
| 2019/0189259 A1* | 6/2019 | Clark | G16H 20/70 |
| 2019/0202061 A1* | 7/2019 | Shukla | G06K 9/00369 |
| 2019/0202063 A1* | 7/2019 | Shukla | B25J 11/0005 |
| 2019/0206401 A1 | 7/2019 | Liu | |
| 2019/0206407 A1 | 7/2019 | Shukla | |

OTHER PUBLICATIONS

International Preliminary Report on Patentability dated Aug. 27, 2020 in International Application PCT/US2018/067690.
Notice of Allowance dated Jan. 6, 2021 in U.S. Appl. No. 16/233,986.
Office Action dated Jan. 13, 2021 in U.S. Appl. No. 16/737,449.
Notice of Allowance dated Jan. 14, 2021 in U.S. Appl. No. 16/233,786.
Notice of Allowance dated Jan. 28, 2021 in U.S. Appl. No. 16/233,829.
Office Action dated Jan. 28, 2021 in U.S. Appl. No. 16/233,640.
Office Action dated Feb. 3, 2021 in U.S. Appl. No. 16/233,678.
Office Action dated Feb. 3, 2021 in U.S. Appl. No. 16/233,716.
Office Action dated Mar. 2, 2021 in U.S. Appl. No. 16/234,041.

* cited by examiner

SYSTEM AND METHOD FOR DYNAMIC ROBOT PROFILE CONFIGURATIONS BASED ON USER INTERACTIONS

CROSS-REFERENCE TO RELATED APPLICATIONS

This application claims priority to U.S. provisional application No. 62/630,912, filed Feb. 15, 2018, the contents of which are incorporated herein by reference in its entirety.

The present application is related to U.S. patent application Ser. No. 16/233,539, filed Dec. 27, 2018, International Application No. PCT/US2018/067630, filed Dec. 27, 2018, U.S. patent application Ser. No. 16/233,566, filed Dec. 27, 2018, International Application No. PCT/US2018/067634, filed Dec. 27, 2018, U.S. patent application Ser. No. 16/233,640, filed Dec. 27, 2018, International Application No. PCT/US2018/067641, filed Dec. 27, 2018, U.S. patent application Ser. No. 16/233,678, filed Dec. 27, 2018, International Application No. PCT/US2018/067649, filed Dec. 27, 2018, U.S. patent application Ser. No. 16/233,716, filed Dec. 27, 2018, International Application No. PCT/US2018/067654, filed Dec. 27, 2018, U.S. patent application Ser. No. 16/233,786, filed Dec. 27, 2018, International Application No. PCT/US2018/067666, filed Dec. 27, 2018, U.S. patent application Ser. No. 16/233,829, filed Dec. 27, 2018, International Application No. PCT/US2018/067672, filed Dec. 27, 2018, U.S. patent application Ser. No. 16/233,879, filed Dec. 27, 2018, International Application No. PCT/US2018/067680, filed Dec. 27, 2018, U.S. patent application Ser. No. 16/233,939, filed Dec. 27, 2018, International Application No. PCT/US2018/067684, filed Dec. 27, 2018, International Application No. PCT/US2018/067690, filed Dec. 27, 2018, U.S. patent application Ser. No. 16/234,041, filed Dec. 27, 2018, and International Application No. PCT/US2018/067695, filed Dec. 27, 2018, which are hereby incorporated by reference in their entireties.

BACKGROUND

1. Technical Field

The present teaching generally relates to human machine communication. More specifically, the present teaching relates to adaptive human machine communication.

2. Technical Background

With advancement of artificial intelligence technologies and the explosion Internet based communications because of the ubiquitous Internet's connectivity, computer aided dialogue systems have become increasingly popular. For example, more and more call centers deploy automated dialogue robots to handle customer calls. Hotels started to install various kiosks that can answer questions from tourists or guests. Online bookings (whether travel accommodations or theater tickets, etc.) are also more frequently done by chatbots. In recent years, automated human machine communications in other areas are also becoming more and more popular.

Such traditional computer aided dialogue systems are usually pre-programed with certain questions and answers based on commonly known patterns of conversations in different domains. Unfortunately, human conversant can be unpredictable and sometimes does not follow a pre-planned dialogue pattern. In addition, in certain situations, a human conversant may digress during the process and continuing a fixed conversation pattern will likely cause irritation or loss of interests. When this happens, such machine traditional dialogue systems often will not be able to continue to engage a human conversant so that the human machine dialogue either has to be aborted to hand the tasks to a human operator or the human conversant simply leaves the dialogue, which is undesirable.

In addition, traditional machine-based dialogue systems are often not designed to address the emotional factor of a human, let alone taking into consideration as to how to address such emotional factor when conversing with a human. For example, a traditional machine dialogue system usually does not initiate the conversation unless a human activates the system or asks some questions. Even if a traditional dialogue system does initiate a conversation, it has a fixed way to start a conversation and does not change from human to human or adjusted based on observations. As such, although they are programmed to faithfully follow the pre-designed dialogue pattern, they are usually not able to act on the dynamics of the conversation and adapt in order to keep the conversation going in a way that can engage the human. In many situations, when a human involved in a dialogue is clearly annoyed or frustrated, traditional machine dialogue systems are completely unaware and continue the conversation in the same manner that has annoyed the human. This not only makes the conversation end unpleasantly (the machine is still unaware of that) but also turns the person away from conversing with any machine-based dialogue system in the future.

In some applications, conducting a human machine dialogue session based on what is observed from the human is crucially important in order to determine how to proceed effectively. One example is an education related dialogue. When a chatbot is used for teaching a child to read, whether the child is perceptive to the way he/she is being taught has to be monitored and addressed continuously in order to be effective. Another limitation of the traditional dialogue systems is their context unawareness. For example, a traditional dialogue system is not equipped with the ability to observe the context of a conversation and improvise as to dialogue strategy in order to engage a user and improve the user experience.

Thus, there is a need for methods and systems that address such limitations.

SUMMARY

The teachings disclosed herein relate to methods, systems, and programming for human machine communication. More particularly, the present teaching relates to methods, systems, and programming for adaptive human machine communication.

In one example, a method, implemented on a machine having at least one processor, storage, and a communication platform capable of connecting to a network for configuring an animatronic device. Information about a user is obtained for whom an animatronic device is to be configured to carry out a dialogue with the user. One or more preferences of the user are identified from the obtained information and are used to select, from the plurality of selectable profiles, a first selected profile, which specifies parameters to be used to control a manner by which the animatronic device is to communicate with the user. The animatronic device is then configured based on the first selected profile for carrying out the dialogue in the manner specified.

In a different example, a system for configuring an animatronic device is disclosed, which includes a user information based profile selector and a profile configuration integrator. The user information based profile selector is configured for obtaining information about a user for whom an animatronic device is to be configured to carry out a dialogue with the user, identifying one or more preferences of the user from the obtained information, and selecting, from the plurality of selectable profiles, a first selected profile based on the one or more preferences, wherein the first selected profile specifies parameters to be used to control a manner by which the animatronic device is to communicate with the user. The profile configuration integrator is configured for configuring the animatronic device based on the first selected profile for carrying out the dialogue in the manner specified.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for configuring an animatronic device, wherein the medium, when read by the machine, causes the machine to perform a series of steps. Information about a user is obtained for whom an animatronic device is to be configured to carry out a dialogue with the user. One or more preferences of the user are identified from the obtained information and are used to select, from the plurality of selectable profiles, a first selected profile, which specifies parameters to be used to control a manner by which the animatronic device is to communicate with the user. The animatronic device is then configured based on the first selected profile for carrying out the dialogue in the manner specified.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
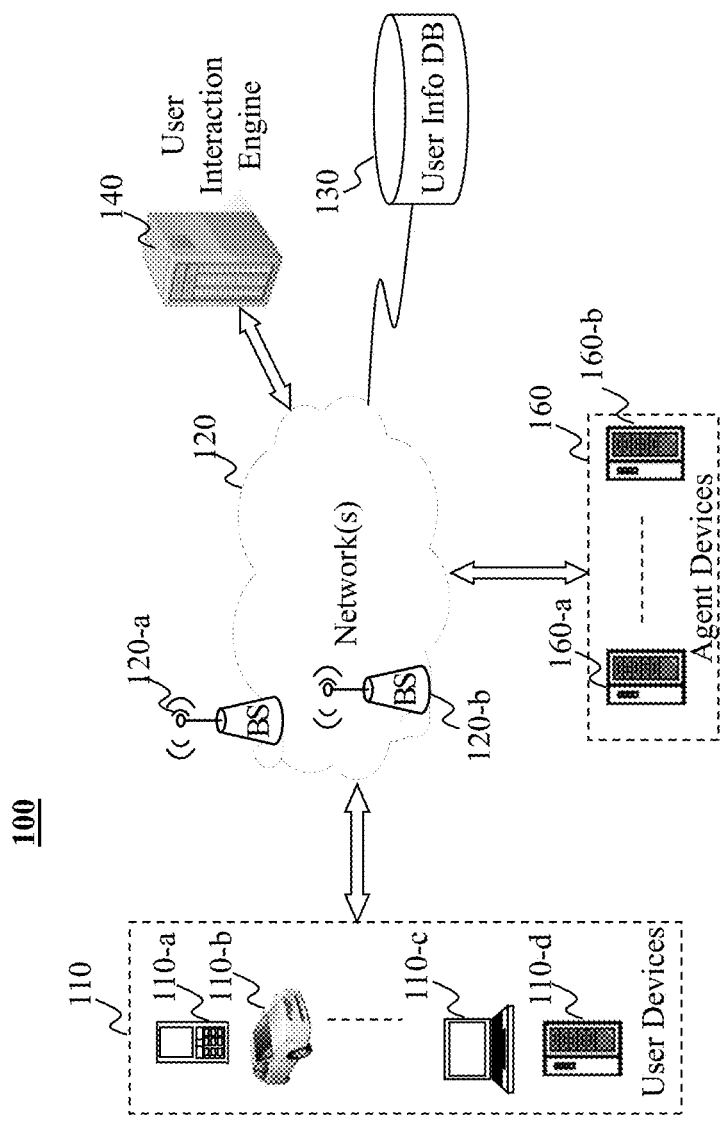
FIG. 1 depicts a networked environment for facilitating a dialogue between a user operating a user device and an agent device in conjunction with a user interaction engine, in accordance with an embodiment of the present teaching.

In the following detailed description, numerous specific details are set forth by way of examples in order to provide a thorough understanding of the relevant teachings. However, it should be apparent to those skilled in the art that the present teachings may be practiced without such details or with different details related to design choices or implementation variations. In other instances, well known methods, procedures, components, and/or hardware/software/firmware have been described at a relatively high-level, without detail, in order to avoid unnecessarily obscuring aspects of the present teachings.

The present teaching aims to address the deficiencies of the traditional human machine dialogue systems and to provide methods and systems that enables a more effective and realistic human to machine dialogue. The present teaching incorporates artificial intelligence in an automated companion with an agent device in conjunction with the backbone support from a user interaction engine so that the automated companion can conduct a dialogue based on continuously monitored multimodal data indicative of the surrounding of the dialogue, adaptively estimating the mindset/emotion/intent of the participants of the dialogue, and adaptively adjust the conversation strategy based on the dynamically changing information/estimates/contextual information.

The automated companion according to the present teaching is capable of personalizing a dialogue by adapting in multiple fronts, including, but not limited to, the subject matter of the conversation, the hardware/components used to carry out the conversation, and the expression/behavior/gesture used to deliver responses to a human conversant. The adaptive control strategy is to make the conversation more realistic and productive by flexibly changing the conversation strategy based on observations on how receptive the human conversant is to the dialogue. The dialogue system according to the present teaching can be configured to achieve a goal driven strategy, including dynamically configuring hardware/software components that are considered most appropriate to achieve an intended goal. Such optimizations are carried out based on learning, including learning from prior conversations as well as from an on-going conversation by continuously assessing a human conversant's behavior/reactions during the conversation with respect to some intended goals. Paths exploited to achieve a goal driven strategy may be determined to maintain the human conversant engaged in the conversation even though in some instances, paths at some moments of time may appear to be deviating from the intended goal.

Specifically, the present teaching relates to dynamically configure a robot agent by adapting to what is sensed in the scene of the dialogue and what is learned from past experiences. This includes activation of animatronic head of a robot agent when it is sensed that a user is in proximity of the robot agent. Various configuration parameters may then be adaptively determined based on the user present in proximity. Such configuration parameters include, but is not limited to, the robot head (e.g., a goose head, a monkey head, a rabbit head, or a duck head) to be used to communicate with the user, spoken language, speech accent, speech style (girl's voice, boy's voice, high pitch adult woman's voice, low deep man's voice, etc.), . . . , and/or a program that drives the dialogue such as specific educational subject matter (e.g., math). Such adaptive configuration of various robot operational parameters may be based on machine learned models established based on observations from prior and on-going dialogues.

FIG. 1 depicts a networked environment 100 for facilitating a dialogue between a user operating a user device and an agent device in conjunction with a user interaction engine, in accordance with an embodiment of the present teaching. In FIG. 1, the exemplary networked environment 100 includes one or more user devices 110, such as user devices 110-a, 110-b, 110-c, and 110-d, one or more agent devices 160, such as agent devices 160-a, . . . 160-b, a user interaction engine 140, and a user information database 130, each of which may communicate with one another via network 120. In some embodiments, network 120 may correspond to a single network or a combination of different networks. For example, network 120 may be a local area network ("LAN"), a wide area network ("WAN"), a public network, a proprietary network, a proprietary network, a Public Telephone Switched Network ("PSTN"), the Internet, an intranet, a Bluetooth network, a wireless network, a virtual network, and/or any combination thereof. In one embodiment, network 120 may also include various network access points. For example, environment 100 may include wired or wireless access points such as, without limitation, base stations or Internet exchange points 120-a, . . . , 120-b. Base stations 120-a and 120-b may facilitate, for example, communications to/from user devices 110 and/or agent devices 160 with one or more other components in the networked framework 100 across different types of network.

A user device, e.g., 110-a, may be of different types to facilitate a user operating the user device to connect to network 120 and transmit/receive signals. Such a user device 110 may correspond to any suitable type of electronic/computing device including, but not limited to, a mobile device (110-*a*), a device incorporated in a transportation vehicle (110-*b*), . . . , a mobile computer (110-*c*), or a stationary device/computer (110-*d*). A mobile device may include, but is not limited to, a mobile phone, a smart phone, a personal display device, a personal digital assistant ("PDAs"), a gaming console/device, a wearable device such as a watch, a Fitbit, a pin/broach, a headphone, etc. A transportation vehicle embedded with a device may include a car, a truck, a motorcycle, a boat, a ship, a train, or an airplane. A mobile computer may include a laptop, an Ultrabook device, a handheld device, etc. A stationary device/computer may include a television, a set top box, a smart household device (e.g., a refrigerator, a microwave, a washer or a dryer, an electronic assistant, etc.), and/or a smart accessory (e.g., a light bulb, a light switch, an electrical picture frame, etc.).

An agent device, e.g., any of 160-*a*, . . . , 160-*b*, may correspond one of different types of devices that may communicate with a user device and/or the user interaction engine 140. Each agent device, as described in greater detail below, may be viewed as an automated companion device that interfaces with a user with, e.g., the backbone support from the user interaction engine 140. An agent device as described herein may correspond to a robot which can be a game device, a toy device, a designated agent device such as a traveling agent or weather agent, etc. The agent device as disclosed herein is capable of facilitating and/or assisting in interactions with a user operating user device. In doing so, an agent device may be configured as a robot capable of controlling some of its parts, via the backend support from the user interaction engine 140, for, e.g., making certain physical movement (such as head), exhibiting certain facial expression (such as curved eyes for a smile), or saying things in a certain voice or tone (such as exciting tones) to display certain emotions.

When a user device (e.g., user device 110-*a*) is connected to an agent device, e.g., 160-*a* (e.g., via either a contact or contactless connection), a client running on a user device, e.g., 110-*a*, may communicate with the automated companion (either the agent device or the user interaction engine or both) to enable an interactive dialogue between the user operating the user device and the agent device. The client may act independently in some tasks or may be controlled remotely by the agent device or the user interaction engine 140. For example, to respond to a question from a user, the agent device or the user interaction engine 140 may control the client running on the user device to render the speech of the response to the user. During a conversation, an agent device may include one or more input mechanisms (e.g., cameras, microphones, touch screens, buttons, etc.) that allow the agent device to capture inputs related to the user or the local environment associated with the conversation. Such inputs may assist the automated companion to develop an understanding of the atmosphere surrounding the conversation (e.g., movements of the user, sound of the environment) and the mindset of the human conversant (e.g., user picks up a ball which may indicates that the user is bored) in order to enable the automated companion to react accordingly and conduct the conversation in a manner that will keep the user interested and engaging.

In the illustrated embodiments, the user interaction engine 140 may be a backend server, which may be centralized or distributed. It is connected to the agent devices and/or user devices. It may be configured to provide backbone support to agent devices 160 and guide the agent devices to conduct conversations in a personalized and customized manner. In some embodiments, the user interaction engine 140 may receive information from connected devices (either agent devices or user devices), analyze such information, and control the flow of the conversations by sending instructions to agent devices and/or user devices. In some embodiments, the user interaction engine 140 may also communicate directly with user devices, e.g., providing dynamic data, e.g., control signals for a client running on a user device to render certain responses.

Generally speaking, the user interaction engine 140 may control the state and the flow of conversations between users and agent devices. The flow of each of the conversations may be controlled based on different types of information associated with the conversation, e.g., information about the user engaged in the conversation (e.g., from the user information database 130), the conversation history, information related to the conversations, and/or the real time user feedbacks. In some embodiments, the user interaction engine 140 may be configured to obtain various sensory inputs such as, and without limitation, audio inputs, image inputs, haptic inputs, and/or contextual inputs, process these inputs, formulate an understanding of the human conversant, accordingly generate a response based on such understanding, and control the agent device and/or the user device to carry out the conversation based on the response. As an illustrative example, the user interaction engine 140 may receive audio data representing an utterance from a user operating the user device, and generate a response (e.g., text) which may then be delivered to the user in the form of a computer generated utterance as a response to the user. As yet another example, the user interaction engine 140 may also, in response to the utterance, generate one or more instructions that control an agent device to perform a particular action or set of actions.

As illustrated, during a human machine dialogue, a user, as the human conversant in the dialogue, may communicate across the network 120 with an agent device or the user interaction engine 140. Such communication may involve data in multiple modalities such as audio, video, text, etc. Via a user device, a user can send data (e.g., a request, audio signal representing an utterance of the user, or a video of the scene surrounding the user) and/or receive data (e.g., text or audio response from an agent device). In some embodiments, user data in multiple modalities, upon being received by an agent device or the user interaction engine 140, may be analyzed to understand the human user's speech or gesture so that the user's emotion or intent may be estimated and used to determine a response to the user.

Figure 2A:
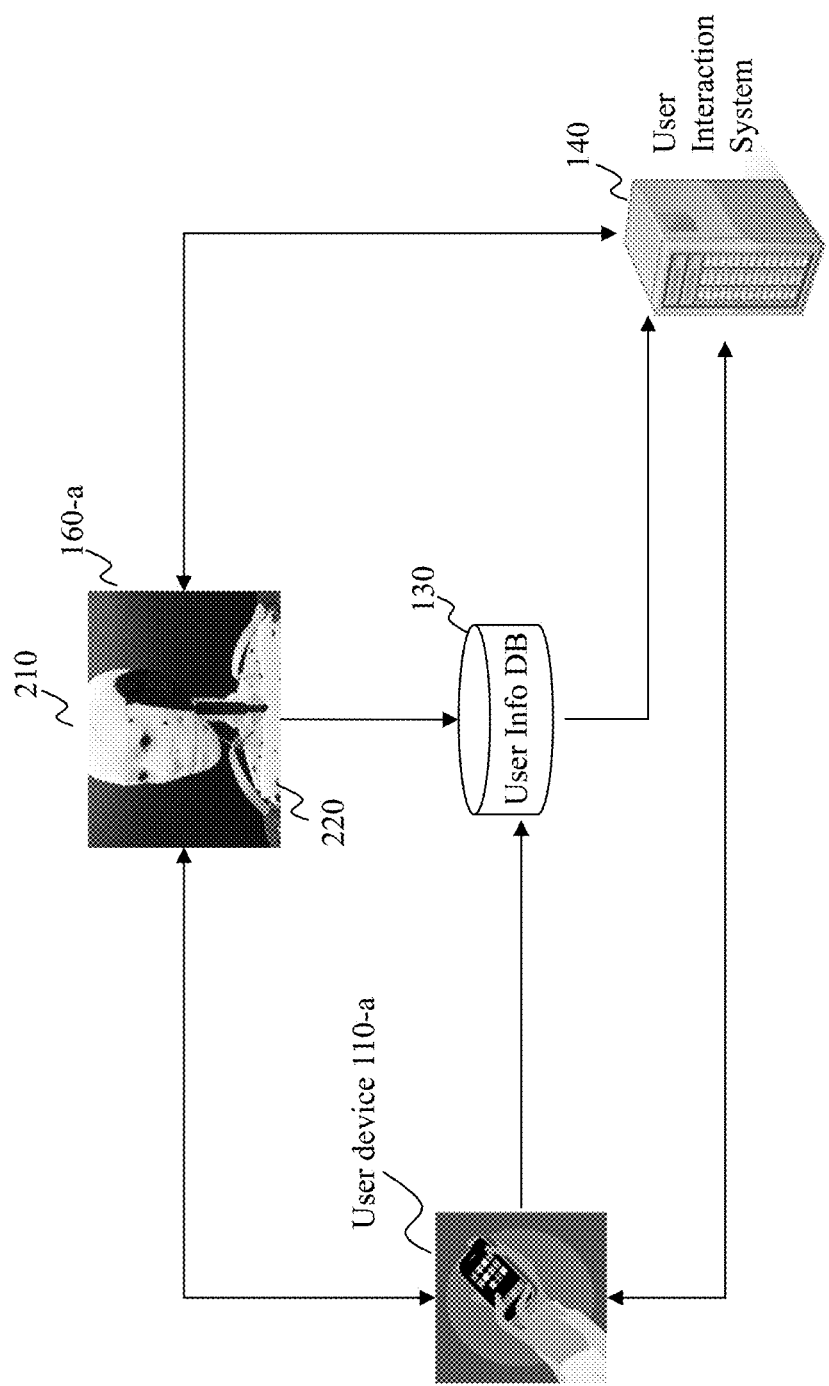
FIGS. 2A-2B depict connections among a user device, an agent device, and a user interaction engine during a dialogue, in accordance with an embodiment of the present teaching.

FIG. 2A depicts specific connections among a user device 110-*a*, an agent device 160-*a*, and the user interaction engine 140 during a dialogue, in accordance with an embodiment of the present teaching. As seen, connections between any two of the parties may all be bi-directional, as discussed herein. The agent device 160-*a* may interface with the user via the user device 110-*a* to conduct a dialogue in a bi-directional manner. On one hand, the agent device 160-*a* may be controlled by the user interaction engine 140 to utter a response to the user operating the user device 110-*a*. On the other hand, inputs from the user site, including, e.g., both the user's utterance or action as well as information about the surrounding of the user, are provided to the agent device via the connections. The agent device 160-*a* may be configured to process such input and dynamically adjust its response to the user. For example, the agent device may be instructed by the user interaction engine 140 to render a tree on the user device. Knowing that the surrounding environment of the user (based on visual information from the user device) shows green trees and lawns, the agent device may customize the tree to be rendered as a lush green tree. If the scene from the user site shows that it is a winter weather, the agent device may control to render the tree on the user device with parameters for a tree that has no leaves. As another example, if the agent device is instructed to render a duck on the user device, the agent device may retrieve information from the user information database 130 on color preference and generate parameters for customizing the duck in a user's preferred color before sending the instruction for the rendering to the user device.

In some embodiments, such inputs from the user's site and processing results thereof may also be transmitted to the user interaction engine 140 for facilitating the user interaction engine 140 to better understand the specific situation associated with the dialogue so that the user interaction engine 140 may determine the state of the dialogue, emotion/mindset of the user, and generate a response that is based on the specific situation of the dialogue and the intended purpose of the dialogue (e.g., for teaching a child the English vocabulary). For example, if information received from the user device indicates that the user appears to be bored and impatient, the user interaction engine 140 may determine to change the state of dialogue to a topic that is of interest of the user (e.g., based on the information from the user information database 130) in order to continue to engage the user in the conversation.

In some embodiments, a client running on the user device may be configured to be able to process raw inputs of different modalities acquired from the user site and send the processed information (e.g., relevant features of the raw inputs) to the agent device or the user interaction engine for further processing. This will reduce the amount of data transmitted over the network and enhance the communication efficiency. Similarly, in some embodiments, the agent device may also be configured to be able to process information from the user device and extract useful information for, e.g., customization purposes. Although the user interaction engine 140 may control the state and flow control of the dialogue, making the user interaction engine 140 light weight improves the user interaction engine 140 scale better.

Figure 2B:
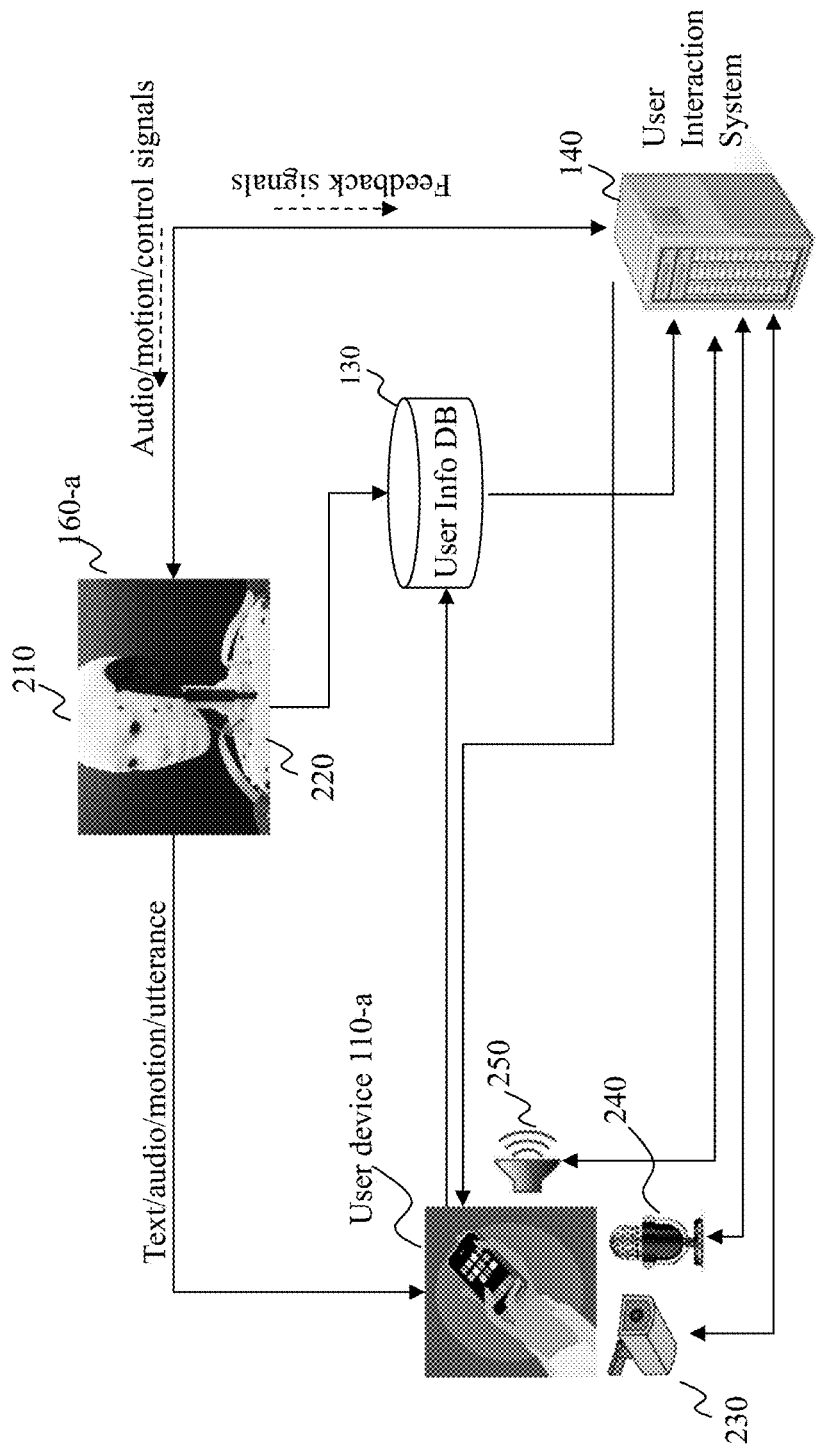

FIG. 2B depicts the same setting as what is presented in FIG. 2A with additional details on the user device 110-a. As shown, during a dialogue between the user and the agent 210, the user device 110-a may continually collect multi-modal sensor data related to the user and his/her surroundings, which may be analyzed to detect any information related to the dialogue and used to intelligently control the dialogue in an adaptive manner. This may further enhance the user experience or engagement. FIG. 2B illustrates exemplary sensors such as video sensor 230, audio sensor 240, . . . , or haptic sensor 250. The user device may also send textual data as part of the multi-model sensor data. Together, these sensors provide contextual information surrounding the dialogue and can be used by the user interaction system 140 to understand the situation in order to manage the dialogue. In some embodiment, the multi-modal sensor data may first be processed on the user device and important features in different modalities may be extracted and sent to the user interaction system 140 so that dialogue may be controlled with an understanding of the context. In some embodiments, the raw multi-modal sensor data may be sent directly to the user interaction system 140 for processing.

Figure 3A:
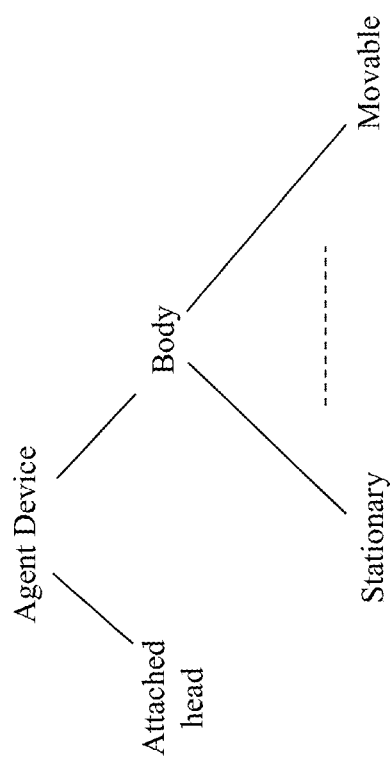
FIG. 3A illustrates an exemplary structure of an agent device with exemplary types of agent body, in accordance with an embodiment of the present teaching.

As shown in FIGS. 2A-2B, the agent device may correspond to a robot that has different parts, including its head 210 and its body 220. Although the agent device as illustrated in FIGS. 2A-2B appears to be a person robot, it may also be constructed in other forms as well, such as a duck, a bear, a rabbit, etc. FIG. 3A illustrates an exemplary structure of an agent device with exemplary types of agent body, in accordance with an embodiment of the present teaching. As presented, an agent device may include a head and a body with the head attached to the body. In some embodiments, the head of an agent device may have additional parts such as face, nose and mouth, some of which may be controlled to, e.g., make movement or expression. In some embodiments, the face on an agent device may correspond to a display screen on which a face can be rendered, and the face may be of a person or of an animal. Such displayed face may also be controlled to express emotion.

The body part of an agent device may also correspond to different forms such as a duck, a bear, a rabbit, etc. The body of the agent device may be stationary, movable, or semi-movable. An agent device with stationary body may correspond to a device that can sit on a surface such as a table to conduct face to face conversation with a human user sitting next to the table. An agent device with movable body may correspond to a device that can move around on a surface such as table surface or floor. Such a movable body may include parts that can be kinematically controlled to make physical moves. For example, an agent body may include feet which can be controlled to move in space when needed. In some embodiments, the body of an agent device may be semi-movable, i.e., some part is movable and some are not. For example, a tail on the body of an agent device with a duck appearance may be movable but the duck cannot move in space. A bear body agent device may also have arms that may be movable but the bear can only sit on a surface.

Figure 3B:
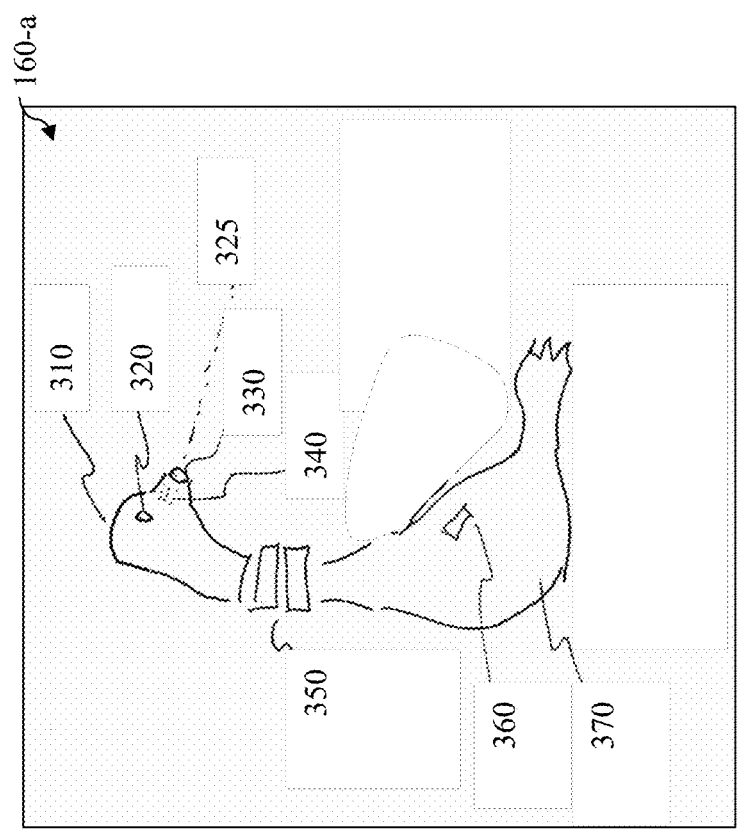
FIG. 3B illustrates an exemplary agent device, in accordance with an embodiment of the present teaching.

FIG. 3B illustrates an exemplary agent device or automated companion 160-a, in accordance with an embodiment of the present teaching. The automated companion 160-a is a device that interacts with people using speech and/or facial expression or physical gestures. For example, the automated companion 160-a corresponds to an animatronic peripheral device with different parts, including head portion 310, eye portion (cameras) 320, a mouth portion with laser 325 and a microphone 330, a speaker 340, neck portion with servos 350, one or more magnet or other components that can be used for contactless detection of presence 360, and a body portion corresponding to, e.g., a charge base 370. In operation, the automated companion 160-a may be connected to a user device which may include a mobile multi-function device (110-a) via network connections. Once connected, the automated companion 160-a and the user device interact with each other via, e.g., speech, motion, gestures, and/or via pointing with a laser pointer.

Other exemplary functionalities of the automated companion 160-a may include reactive expressions in response to a user's response via, e.g., an interactive video cartoon character (e.g., avatar) displayed on, e.g., a screen as part of a face on the automated companion. The automated companion may use a camera (320) to observe the user's presence, facial expressions, direction of gaze, surroundings, etc. An animatronic embodiment may "look" by pointing its head (310) containing a camera (320), "listen" using its microphone (340), "point" by directing its head (310) that can move via servos (350). In some embodiments, the head of the agent device may also be controlled remotely by a, e.g., the user interaction system 140 or by a client in a user device (110-a), via a laser (325). The exemplary automated companion 160-a as shown in FIG. 3B may also be controlled to "speak" via a speaker (330).

Figure 4A:
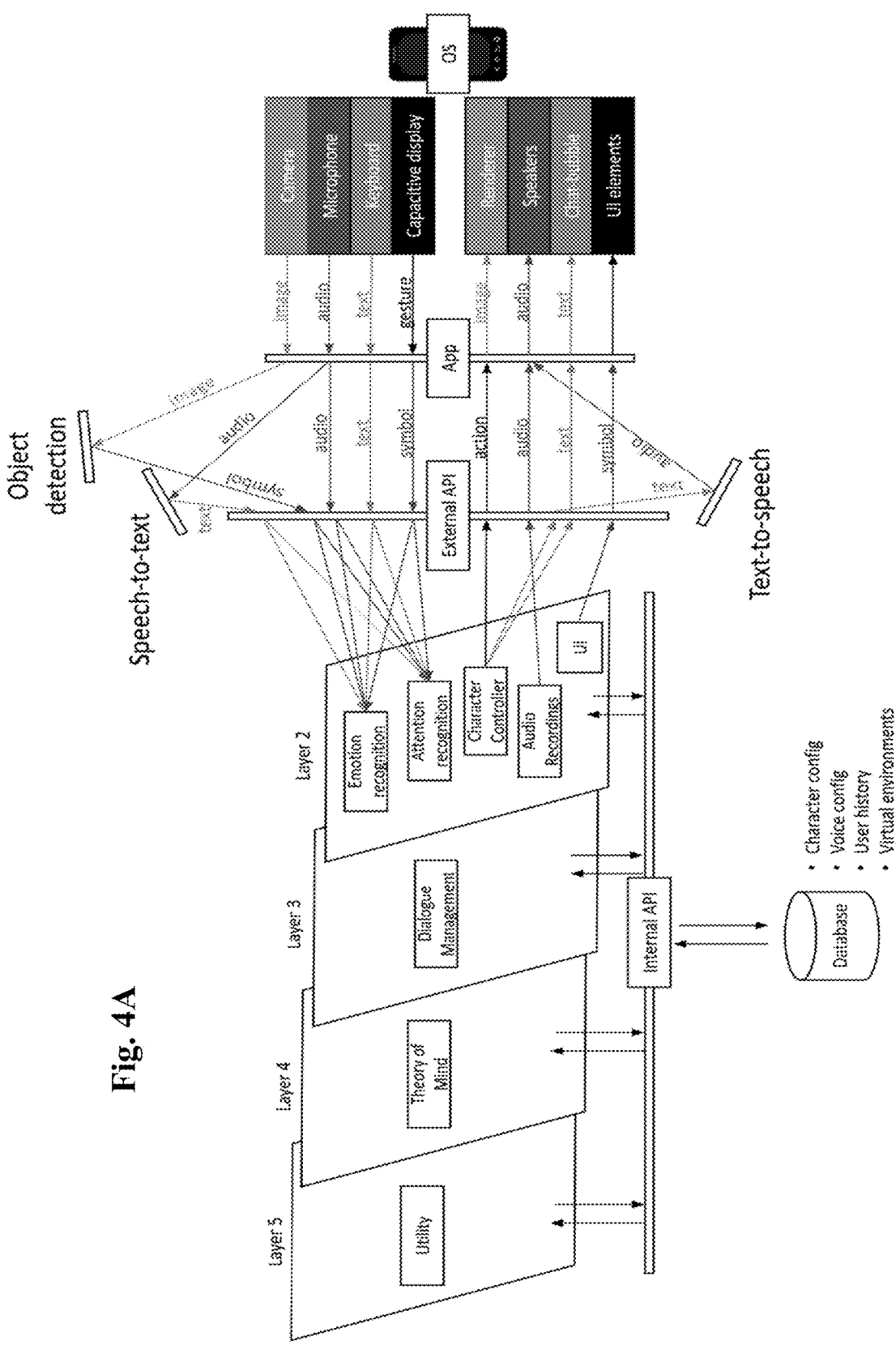
FIG. 4A depicts an exemplary high-level system diagram for an overall system for the automated companion, according to various embodiments of the present teaching.

FIG. 4A depicts an exemplary high-level system diagram for an overall system for the automated companion, according to various embodiments of the present teaching. In this illustrated embodiment, the overall system may encompass components/function modules residing in a user device, an agent device, and the user interaction engine 140. The overall system as depicted herein comprises a plurality of layers of processing and hierarchies that together carries out human-machine interactions in an intelligent manner. In the illustrated embodiment, there are 5 layers, including layer 1 for front end application as well as front end multi-modal data processing, layer 2 for characterizations of the dialog setting, layer 3 in which the dialog management module resides, layer 4 for estimated mindset of different parties (human, agent, device, etc.), layer 5 for so called utility. Different layers may correspond to different levels of processing, ranging from raw data acquisition and processing at layer 1 to processing changing utilities of participants of dialogues in layer 5.

The term "utility" is hereby defined as preferences of a party identified based on states detected associated with dialogue histories. Utility may be associated with a party in a dialogue, whether the party is a human, the automated companion, or other intelligent devices. A utility for a particular party may represent different states of a world, whether physical, virtual, or even mental. For example, a state may be represented as a particular path along which a dialog walks through in a complex map of the world. At different instances, a current state evolves into a next state based on the interaction between multiple parties. States may also be party dependent, i.e., when different parties participate in an interaction, the states arising from such interaction may vary. A utility associated with a party may be organized as a hierarchy of preferences and such a hierarchy of preferences may evolve over time based on the party's choices made and likings exhibited during conversations. Such preferences, which may be represented as an ordered sequence of choices made out of different options, is what is referred to as utility. The present teaching discloses method and system by which an intelligent automated companion is capable of learning, through a dialogue with a human conversant, the user's utility.

Within the overall system for supporting the automated companion, front end applications as well as front end multi-modal data processing in layer 1 may reside in a user device and/or an agent device. For example, the camera, microphone, keyboard, display, renderer, speakers, chat-bubble, and user interface elements may be components or functional modules of the user device. For instance, there may be an application or client running on the user device which may include the functionalities before an external application interface (API) as shown in FIG. 4A. In some embodiments, the functionalities beyond the external API may be considered as the backend system or reside in the user interaction engine 140. The application running on the user device may take multi-model data (audio, images, video, text) from the sensors or circuitry of the user device, process the multi-modal data to generate text or other types of signals (object such as detected user face, speech understanding result) representing features of the raw multi-modal data, and send to layer 2 of the system.

In layer 1, multi-modal data may be acquired via sensors such as camera, microphone, keyboard, display, speakers, chat bubble, renderer, or other user interface elements. Such multi-modal data may be analyzed to estimate or infer various features that may be used to infer higher level characteristics such as expression, characters, gesture, emotion, action, attention, intent, etc. Such higher-level characteristics may be obtained by processing units at layer 2 and the used by components of higher layers, via the internal API as shown in FIG. 4A, to e.g., intelligently infer or estimate additional information related to the dialogue at higher conceptual levels. For example, the estimated emotion, attention, or other characteristics of a participant of a dialogue obtained at layer 2 may be used to estimate the mindset of the participant. In some embodiments, such mindset may also be estimated at layer 4 based on additional information, e.g., recorded surrounding environment or other auxiliary information in such surrounding environment such as sound.

The estimated mindsets of parties, whether related to humans or the automated companion (machine), may be relied on by the dialogue management at layer 3, to determine, e.g., how to carry on a conversation with a human conversant. How each dialogue progresses often represents a human user's preferences. Such preferences may be captured dynamically during the dialogue at utilities (layer 5). As shown in FIG. 4A, utilities at layer 5 represent evolving states that are indicative of parties' evolving preferences, which can also be used by the dialogue management at layer 3 to decide the appropriate or intelligent way to carry on the interaction.

Sharing of information among different layers may be accomplished via APIs. In some embodiments as illustrated in FIG. 4A, information sharing between layer 1 and rest of the layers is via an external API while sharing information among layers 2-5 is via an internal API. It is understood that this is merely a design choice and other implementations are also possible to realize the present teaching presented herein. In some embodiments, through the internal API, various layers (2-5) may access information created by or stored at other layers to support the processing. Such information may include common configuration(s) to be applied to a dialogue (e.g., character of the agent device is an avatar, preferred voice, or a virtual environment to be created for the dialogue, etc.), a current state of the dialogue, a current dialogue history, known user preferences, estimated user intent/emotion/mindset, etc. In some embodiments, some information that may be shared via the internal API may be accessed from an external database. For example, certain configurations related to a desired character for the agent device (a duck) may be accessed from, e.g., an open source database, that provides parameters (e.g., parameters to visually render the duck and/or parameters needed to render the speech from the duck).

Figure 4B:
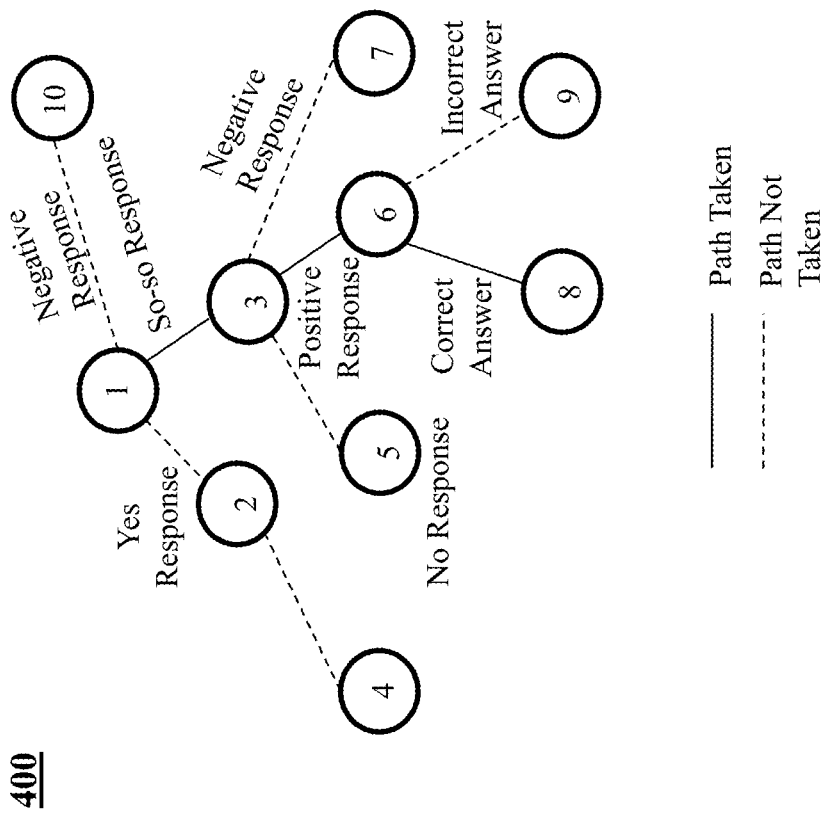
FIG. 4B illustrates a part of a dialogue tree of an on-going dialogue with paths taken based on interactions between the automated companion and a user, according to an embodiment of the present teaching.

FIG. 4B illustrates a part of a dialogue tree of an on-going dialogue with paths taken based on interactions between the automated companion and a user, according to an embodiment of the present teaching. In this illustrated example, the dialogue management at layer 3 (of the automated companion) may predict multiple paths with which a dialogue, or more generally an interaction, with a user may proceed. In this example, each node may represent a point of the current state of the dialogue and each branch from a node may represent possible responses from a user. As shown in this example, at node 1, the automated companion may have three separate paths which may be taken depending on a response detected from a user. If the user responds with an affirmative response, dialogue tree 400 may proceed from node 1 to node 2. At node 2, a response may be generated for the automated companion in response to the affirmative response from the user and may then be rendered to the user, which may include audio, visual, textual, haptic, or any combination thereof.

If, at node 1, the user responds negatively, the path is for this stage is from node 1 to node 10. If the user responds, at node 1, with a "so-so" response (e.g., not negative but also not positive), dialogue tree 400 may proceed to node 3, at which a response from the automated companion may be rendered and there may be three separate possible responses from the user, "No response," "Positive Response," and "Negative response," corresponding to nodes 5, 6, and 7, respectively. Depending on the user's actual response with respect to the automated companion's response rendered at node 3, the dialogue management at layer 3 may then follow the dialogue accordingly. For instance, if the user responds at node 3 with a positive response, the automated companion moves to respond to the user at node 6. Similarly, depending on the user's reaction to the automated companion's response at node 6, the user may further respond with an answer that is correct. In this case, the dialogue state moves from node 6 to node 8, etc. In this illustrated example, the dialogue state during this period moved from node 1, to node 3, to node 6, and to node 8. The traversal through nodes 1, 3, 6, and 8 forms a path consistent with the underlying conversation between the automated companion and a user. As shown in FIG. 4B, the path representing the dialogue is represented by the solid lines connecting nodes 1, 3, 6, and 8, whereas the paths skipped during a dialogue is represented by the dashed lines.

Figure 4C:
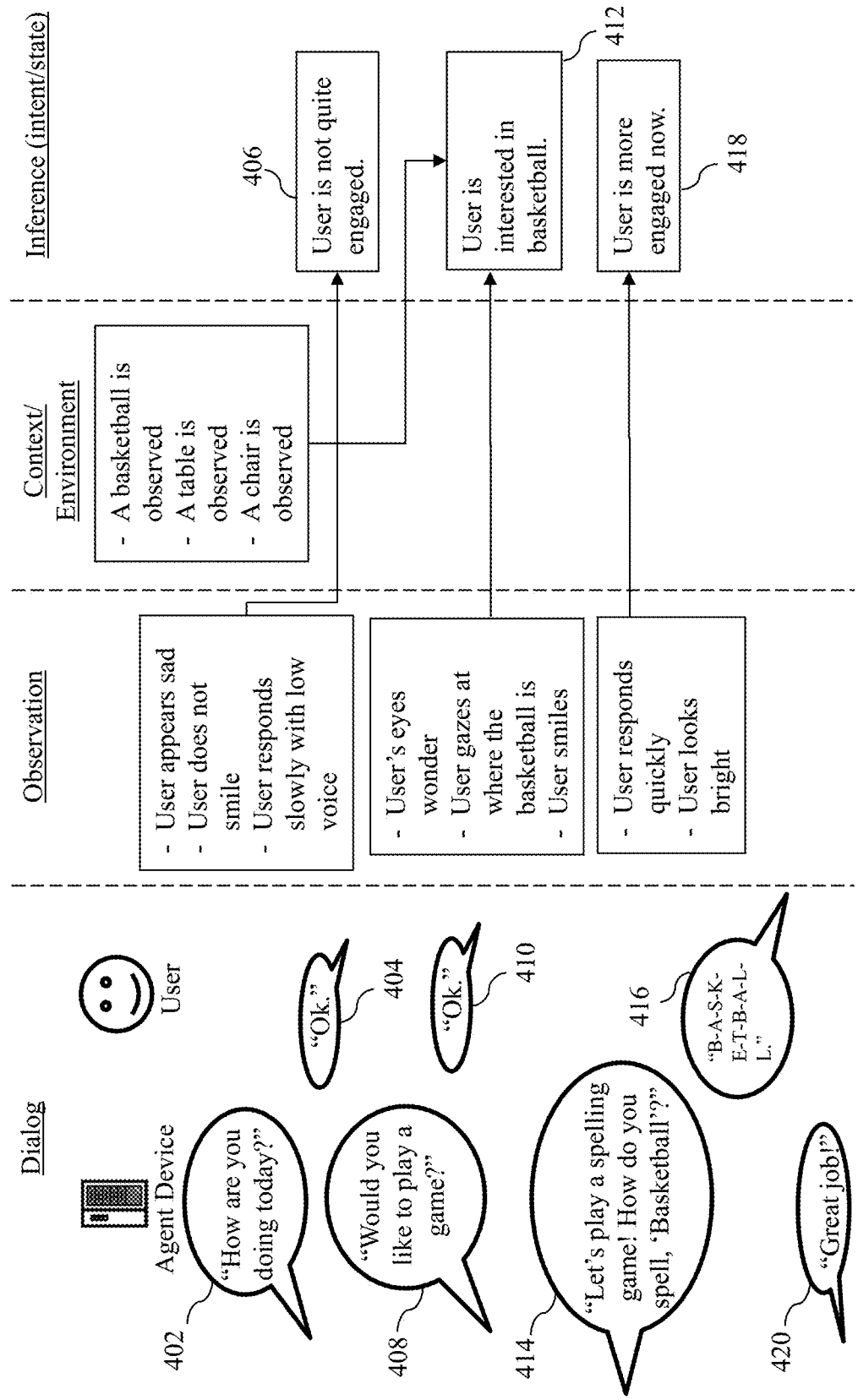
FIG. 4C illustrates an exemplary human-agent device interaction and exemplary processing performed by the automated companion, according to an embodiment of the present teaching.

FIG. 4C illustrates an exemplary human-agent device interaction and exemplary processing performed by the automated companion, according to an embodiment of the present teaching. As shown in FIG. 4C, operations at different layers may be conducted and together they facilitate intelligent dialogue in a cooperated manner. In the illustrated example, an agent device may first ask a user "How are you doing today?" at 402 to initiate a conversation. In response to utterance at 402, the user may respond with utterance "Ok" at 404. To manage the dialogue, the automated companion may activate different sensors during the dialogue to make observation of the user and the surrounding environment. For example, the agent device may acquire multi-modal data about the surrounding environment where the user is in. Such multi-modal data may include audio, visual, or text data. For example, visual data may capture the facial expression of the user. The visual data may also reveal contextual information surrounding the scene of the conversation. For instance, a picture of the scene may reveal that there is a basketball, a table, and a chair, which provides information about the environment and may be leveraged in dialogue management to enhance engagement of the user. Audio data may capture not only the speech response of the user but also other peripheral information such as the tone of the response, the manner by which the user utters the response, or the accent of the user.

Based on acquired multi-modal data, analysis may be performed by the automated companion (e.g., by the front-end user device or by the backend user interaction engine 140) to assess the attitude, emotion, mindset, and utility of the users. For example, based on visual data analysis, the automated companion may detect that the user appears sad, not smiling, the user's speech is slow with a low voice. The characterization of the user's states in the dialogue may be performed at layer 2 based on multi-model data acquired at layer 1. Based on such detected observations, the automated companion may infer (at 406) that the user is not that interested in the current topic and not that engaged. Such inference of emotion or mental state of the user may, for instance, be performed at layer 4 based on characterization of the multi-modal data associated with the user.

To respond to the user's current state (not engaged), the automated companion may determine to perk up the user in order to better engage the user. In this illustrated example, the automated companion may leverage what is available in the conversation environment by uttering a question to the user at 408: "Would you like to play a game?" Such a question may be delivered in an audio form as speech by converting text to speech, e.g., using customized voices individualized for the user. In this case, the user may respond by uttering, at 410, "Ok." Based on the continuously acquired multi-model data related to the user, it may be observed, e.g., via processing at layer 2, that in response to the invitation to play a game, the user's eyes appear to be wandering, and in particular that the user's eyes may gaze towards where the basketball is located. At the same time, the automated companion may also observe that, once hearing the suggestion to play a game, the user's facial expression changes from "sad" to "smiling." Based on such observed characteristics of the user, the automated companion may infer, at 412, that the user is interested in basketball.

Based on the acquired new information and the inference thereof, the automated companion may decide to leverage the basketball available in the environment to make the dialogue more engaging for the user yet still achieving the educational goal for the user. In this case, the dialogue management at layer 3 may adapt the conversion to talk about a game and leverage the observation that the user gazed at the basketball in the room to make the dialogue more interesting to the user yet still achieving the goal of, e.g., educating the user. In one example embodiment, the automated companion generates a response, suggesting the user to play a spelling game" (at 414) and asking the user to spell the word "basketball."

Given the adaptive dialogue strategy of the automated companion in light of the observations of the user and the environment, the user may respond providing the spelling of word "basketball." (at 416). Observations are continuously made as to how enthusiastic the user is in answering the spelling question. If the user appears to respond quickly with a brighter attitude, determined based on, e.g., multi-modal data acquired when the user is answering the spelling question, the automated companion may infer, at 418, that the user is now more engaged. To further encourage the user to actively participate in the dialogue, the automated companion may then generate a positive response "Great job!" with instruction to deliver this response in a bright, encouraging, and positive voice to the user.

Figure 5:
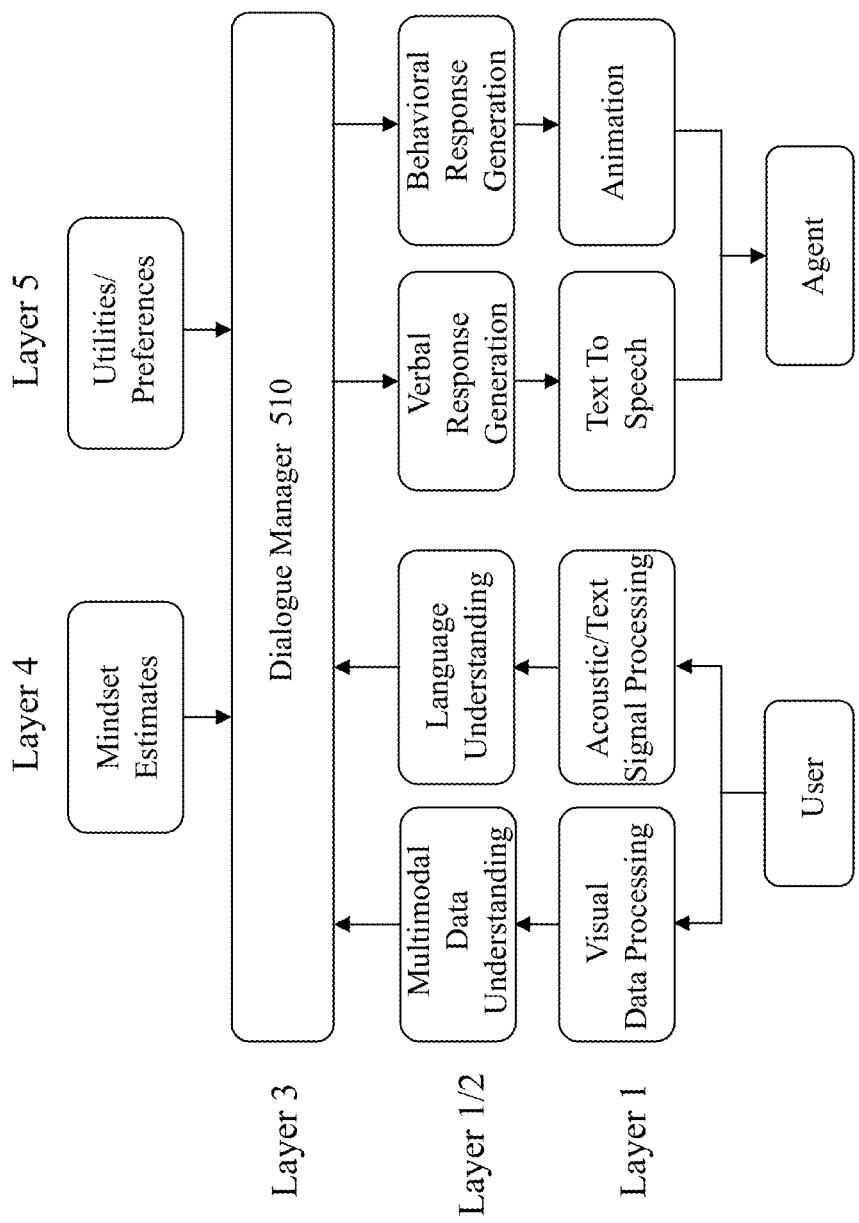
FIG. 5 illustrates exemplary multiple layer processing and communications among different processing layers of an automated dialogue companion, according to an embodiment of the present teaching.

FIG. 5 illustrates exemplary communications among different processing layers of an automated dialogue companion centered around a dialogue manager 510, according to various embodiments of the present teaching. The dialogue manager 510 in FIG. 5 corresponds to a functional component of the dialogue management at layer 3. A dialog manager is an important part of the automated companion and it manages dialogues. Traditionally, a dialogue manager takes in as input a user's utterances and determines how to respond to the user. This is performed without considering the user's preferences, user's mindset/emotions/intent, or surrounding environment of the dialogue, i.e., given any weights to the different available states of the relevant world. The lack of an understanding of the surrounding world often limits the perceived authenticity of or engagement in the conversations between a human user and an intelligent agent.

In some embodiments of the present teaching, the utility of parties of a conversation relevant to an on-going dialogue is exploited to allow a more personalized, flexible, and engaging conversion to be carried out. It facilitates an intelligent agent acting in different roles to become more effective in different tasks, e.g., scheduling appointments, booking travel, ordering equipment and supplies, and researching online on various topics. When an intelligent agent is aware of a user's dynamic mindset, emotions, intent, and/or utility, it enables the agent to engage a human conversant in the dialogue in a more targeted and effective way. For example, when an education agent teaches a child, the preferences of the child (e.g., color he loves), the emotion observed (e.g., sometimes the child does not feel like continue the lesson), the intent (e.g., the child is reaching out to a ball on the floor instead of focusing on the lesson) may all permit the education agent to flexibly adjust the focus subject to toys and possibly the manner by which to continue the conversation with the child so that the child may be given a break in order to achieve the overall goal of educating the child.

As another example, the present teaching may be used to enhance a customer service agent in its service by asking questions that are more appropriate given what is observed in real-time from the user and hence achieving improved user experience. This is rooted in the essential aspects of the present teaching as disclosed herein by developing the means and methods to learn and adapt preferences or mindsets of parties participating in a dialogue so that the dialogue can be conducted in a more engaging manner.

Dialogue manager (DM) 510 is a core component of the automated companion. As shown in FIG. 5, DM 510 (layer 3) takes input from different layers, including input from layer 2 as well as input from higher levels of abstraction such as estimated mindset from layer 4 and utilities/preferences from layer 5. As illustrated, at layer 1, multi-modal information is acquired from sensors in different modalities which is processed to, e.g., obtain features that characterize the data. This may include signal processing in visual, acoustic, and textual modalities.

Processed features of the multi-modal data may be further processed at layer 2 to achieve language understanding and/or multi-modal data understanding including visual, textual, and any combination thereof. Some of such understanding may be directed to a single modality, such as speech understanding, and some may be directed to an understanding of the surrounding of the user engaging in a dialogue based on integrated information. Such understanding may be physical (e.g., recognize certain objects in the scene), perceivable (e.g., recognize what the user said, or certain significant sound, etc.), or mental (e.g., certain emotion such as stress of the user estimated based on, e.g., the tune of the speech, a facial expression, or a gesture of the user).

The modal-data understanding generated at layer 2 may be used by DM 510 to determine how to respond. To enhance engagement and user experience, the DM 510 may also determine a response based on the estimated mindset of the user from layer 4 as well as the utilities of the user engaged in the dialogue from layer 5. An output of DM 510 corresponds to an accordingly determined response to the user. To deliver a response to the user, the DM 510 may also formulate a way that the response is to be delivered. The form in which the response is to be delivered may be determined based on information from multiple sources, e.g., the user's emotion (e.g., if the user is a child who is not happy, the response may be rendered in a gentle voice), the user's utility (e.g., the user may prefer speech in certain accent similar to his parents'), or the surrounding environment that the user is in (e.g., noisy place so that the response needs to be delivered in a high volume). DM 510 may output the response determined together with such delivery parameters.

In some embodiments, the delivery of such determined response is achieved by generating the deliverable form(s) of each response in accordance with various parameters associated with the response. In a general case, a response is delivered in the form of speech in some natural language. A response may also be delivered in speech coupled with a particular nonverbal expression as a part of the delivered response, such as a nod, a shake of the head, a blink of the eyes, or a shrug. There may be other forms of deliverable form of a response that is acoustic but not verbal, e.g., a whistle.

To deliver a response, a deliverable form of the response may be generated via, e.g., verbal response generation and/or behavior response generation, as depicted in FIG. 5. Such a response in its determined deliverable form(s) may then be used by a renderer to actual render the response in its intended form(s). For a deliverable form in a natural language, the text of the response may be used to synthesize a speech signal via, e.g., text to speech techniques, in accordance with the delivery parameters (e.g., volume, accent, style, etc.). For any response or part thereof, that is to be delivered in a non-verbal form(s), e.g., with a certain expression, the intended non-verbal expression may be translated into, e.g., via animation, control signals that can be used to control certain parts of the agent device (physical representation of the automated companion) to perform certain mechanical movement to deliver the non-verbal expression of the response, e.g., nodding head, shrug shoulders, or whistle. In some embodiments, to deliver a response, certain software components may be invoked to render a different facial expression of the agent device. Such rendition(s) of the response may also be simultaneously carried out by the agent (e.g., speak a response with a joking voice and with a big smile on the face of the agent).

Figure 6:
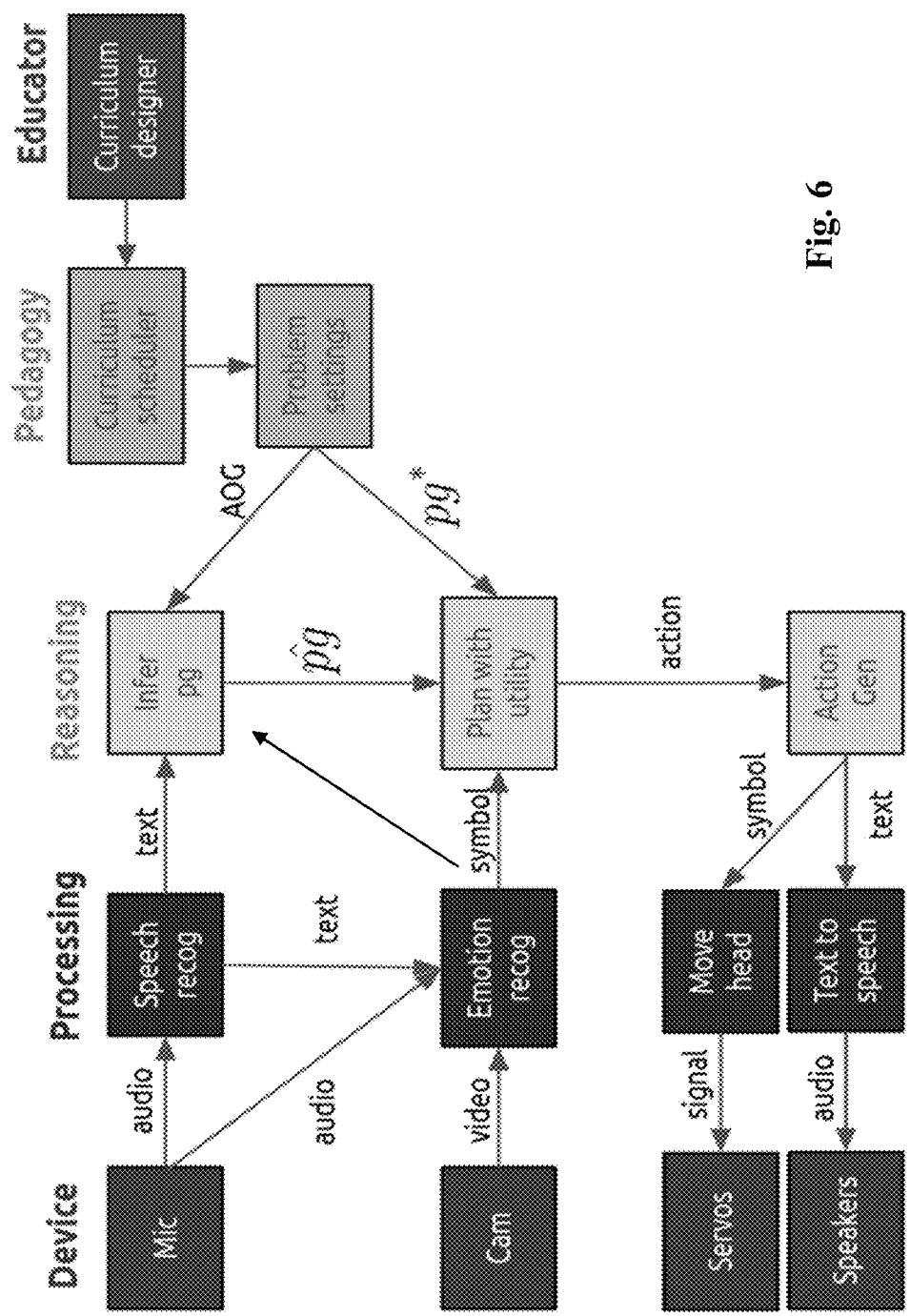
FIG. 6 depicts an exemplary high level system framework for an artificial intelligence based educational companion, according to an embodiment of the present teaching.

FIG. 6 depicts an exemplary high level system diagram for an artificial intelligence based educational companion, according to various embodiments of the present teaching. In this illustrated embodiment, there are five levels of processing, namely device level, processing level, reasoning level, pedagogy or teaching level, and educator level. The device level comprising sensors such as microphone and camera or media delivery devices such as servos to move, e.g., body parts of a robot or speakers to deliver dialogue content. The processing level comprises various processing components directed to processing of different types of signals, which include both input and output signals.

On the input side, the processing level may include speech processing module for performing, e.g., speech recognition based on audio signal obtained from an audio sensor (microphone) to understand what is being uttered in order to determine how to respond. The audio signal may also be recognized to generate text information for further analysis. The audio signal from the audio sensor may also be used by an emotion recognition processing module. The emotion recognition module may be designed to recognize various emotions of a party based on both visual information from a camera and the synchronized audio information. For instance, a happy emotion may often be accompanied with a smile face and a certain acoustic cue. The text information obtained via speech recognition may also be used by the emotion recognition module, as a part of the indication of the emotion, to estimate the emotion involved.

On the output side of the processing level, when a certain response strategy is determined, such strategy may be translated into specific actions to be taken by the automated companion to respond to the other party. Such action may be carried out by either delivering some audio response or expressing certain emotion or attitude via certain gesture. When the response is to be delivered in audio, text with words that need to be spoken are processed by a text to speech module to produce audio signals and such audio signals are then sent to the speakers to render the speech as a response. In some embodiments, the speech generated based on text may be performed in accordance with other parameters, e.g., that may be used to control the generation of speech with certain tones or voices. If the response is to be delivered as a physical action, such as a body movement realized on the automated companion, the actions to be taken may also be instructions to be used to generate such body movement. For example, the processing level may include a module for moving the head (e.g., nodding, shaking, or other movement of the head) of the automated companion in accordance with some instruction (symbol). To follow the instruction to move the head, the module for moving the head may generate electrical signal, based on the instruction, and send to servos to physically control the head movement.

The third level is the reasoning level, which is used to perform high level reasoning based on analyzed sensor data. Text from speech recognition, or estimated emotion (or other characterization) may be sent to an inference program which may operate to infer various high level concepts such as intent, mindset, preferences based on information received from the second level. The inferred high level concepts may then be used by a utility based planning module that devises a plan to respond in a dialogue given the teaching plans defined at the pedagogy level and the current state of the user. The planned response may then be translated into an action to be performed to deliver the planned response. The action is then further processed by an action generator to specifically direct to different media platform to carry out the intelligent response.

The pedagogy and educator levels both relate to the educational application as disclosed. The educator level includes activities related to designing curriculums for different subject matters. Based on designed curriculum, the pedagogy level includes a curriculum scheduler that schedules courses based on the designed curriculum and based on the curriculum schedule, the problem settings module may arrange certain problems settings be offered based on the specific curriculum schedule. Such problem settings may be used by the modules at the reasoning level to assist to infer the reactions of the users and then plan the response accordingly based on utility and inferred state of mind.

The disclosure presented so far relates to the general framework of the automated companion. Details related to different aspects of the present teaching related to adaptively configure hardware and software components of the automated companion are to be discussed below with reference to additional figures.

Figure 7:
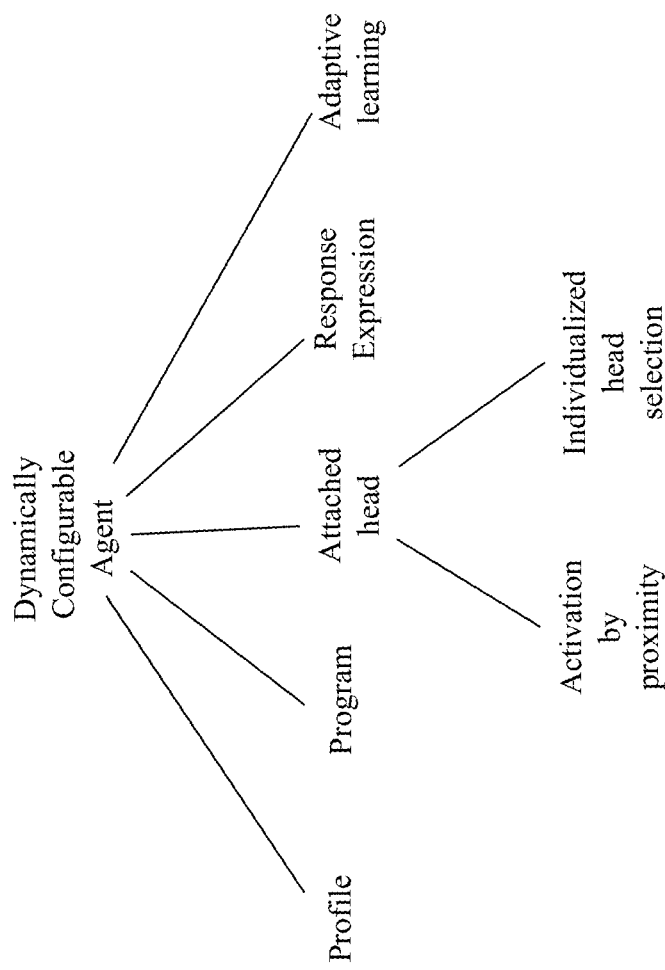
FIG. 7 depicts different aspects of an automated dialogue companion that may be adaptively configured, according to an embodiment of the present teaching.

FIG. 7 depicts different aspects of an automated dialogue companion that may be adaptively configured, according to an embodiment of the present teaching. As illustrated, for a dynamically configurable automated dialogue agent, the attached head may be configured dynamically, including activating a robot head only when a user in a close range is detected and selectively activating a head that is appropriate for the user detected in proximity. Once the robot head is selected, a profile with parameters that can be used to control the robot head may also be dynamically configured. For instance, a robot head may be configured with a profile selected for a woman user with, e.g., parameters that correspond to a woman's speech with a high pitch voice, a British accent, and average speech speed. A different profile may be configured for a man with parameters that can be used to generate a man's voice with low pitch and American accent.

In addition to speech style, the robot head of an automated dialogue companion may also be dynamically configured to have expressions when conveying a response to a user. For instance, when a user answers several questions correctly, the automated dialogue companion may be controlled to not only say "Excellent" but also render a smiling expression. Such an expression may be rendered on a display screen that may represent the face portion of the robot head. In another example, certain emotion of the robot may be expressed via physical movement of certain parts of the robot. For example, a robot may have arms so that an expression of excitement may be rendered by waving one of the arms. Expression may be configured continuously during a dialogue depending on an assessment of the conversation.

A dialogue between a user and an automated dialogue companion may be driven by a program, which can also be dynamically configured based on situation observed. For example, to initiate a dialogue, an automated dialogue companion may determine a specific program for the user, e.g., a program for first grade math selected because the parents of a child (the user) have previously signed up the program for the user. Such a program will drive the conversation between the dialogue agent and the child. Such a conversation is related to the program and hence may be termed as task related conversation. However, during the conversation, the automated dialogue companion may sense that the conversation is not going well and the child may be distracted with nearby toys. To enhance engagement and user experience, the automated dialogue companion may deviate from the selected program and talk to the user on subject matter (e.g., toy) that is not in the originally intended program. This digression needed for keeping the engagement of the user requires switching from task related conversion (program) to non-task related conversion (a different program). The intent is to continue to engage the user so that at some point, the conversation can switch from non-task related subject matter back to task related subject matter.

Adaptively adjusting the subject matters during a dialogue may be based on adaptive learning applied both to previous conversations but also on an on-going conversation. For instance, if machine learning of previous conversation data indicates, via learned models, that when a child is learning something and becomes frustrated, it is more effective to switch topics temporarily than continue pressing on. Such a learned model may be used in deciding when to dynamically re-configure the program in hand.

Figure 8:
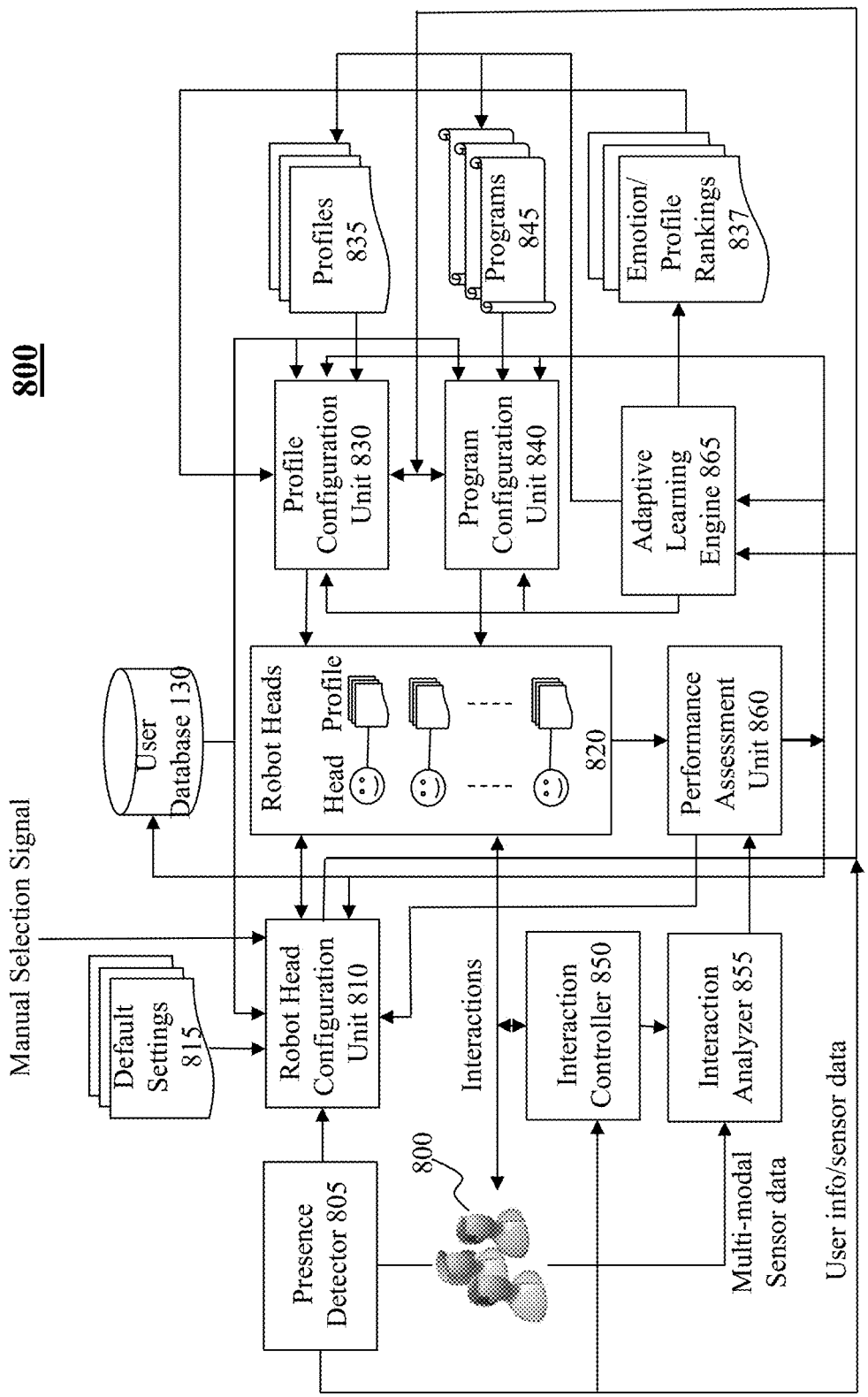
FIG. 8 depicts an exemplary high level system diagram of an automated dialogue companion, according to an embodiment of the present teaching.

FIG. 8 depicts an exemplary high-level system diagram of an automated dialogue companion 800, according to an embodiment of the present teaching. The exemplary automated dialogue companion 800 as illustrated in FIG. 8 includes components that operate to dynamically configure various aspects of the robot as illustrated in FIG. 7. It is understood that the automated dialogue companion 800 may include other components for additional functionalities even though they are not presented in FIG. 8.

As seen, the automated dialogue companion 800 comprises a user presence detector 805 (for detecting the presence of a user approaching the automated dialogue companion in order to activate the robot), a robot head configuration unit 810 (for adaptively configuring a robot's head based on the user), robot heads 820 available (for adaptive selection with each robot head) with a plurality of profiles that may be dynamically configured to be associated with a robot head, a profile configuration unit 830 (for dynamically associating a profile with a selected robot head), a program configuration unit 840 (for dynamically associating a program with a selected robot head), an interaction controller 850 (for conducting a dialogue with a user based on dynamically configured robot head and driven by dynamically configured profile and program), an interaction analyzer 855 (for continuously analyzing user and surrounding), a performance assessment unit 860 (for dynamically determining performance of the user during the dialogue to provide a basis for other components to adaptively reconfigure accordingly), and an adaptive learning engine 865 (for learning from the dialogues).

Figure 9:
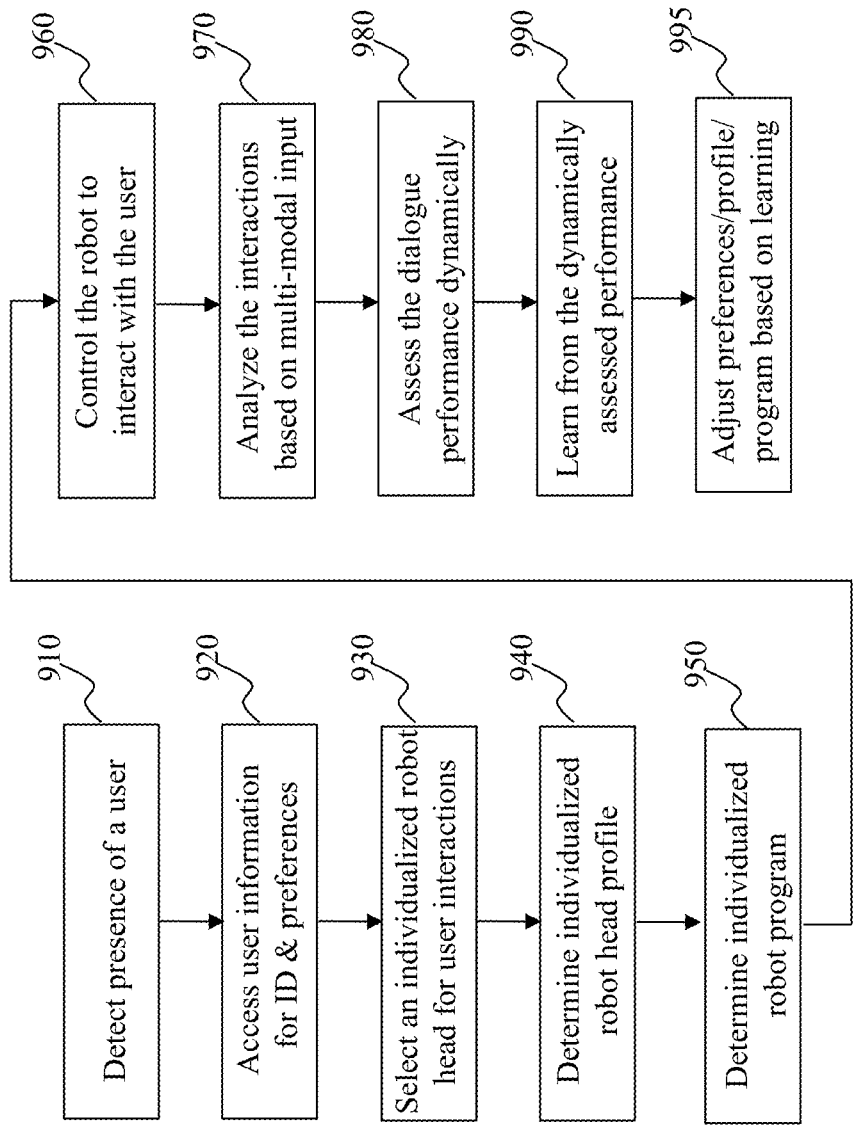
FIG. 9 is a flowchart of an exemplary process of an automated dialogue companion, according to an embodiment of the present teaching.
Figure 10E:
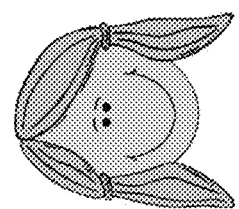
FIGS. 10A-10E illustrate various selectable head of an automated dialogue companion, according to an embodiment of the present teaching.
Figure 10D:
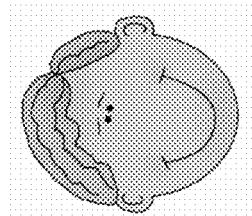
Figure 10C:
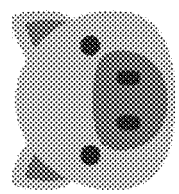
Figure 10B:
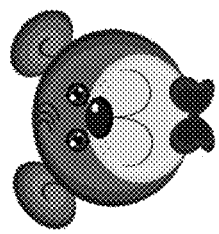
Figure 10A:
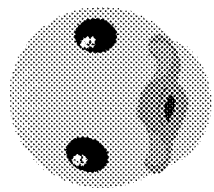

FIG. 9 is a flowchart of an exemplary process of the automated dialogue companion 800, according to an embodiment of the present teaching. In operation, when a user approaches the automated dialogue companion 800, the user presence detector 805 detects, at 910, the user and activates the robot head configuration unit 810. To select an appropriate robot head for the user, the robot head configuration unit 810 accesses, at 920, known information associated with the user such as the identification of the user (which may be sensed by the user presence detector 805), characteristics of the user (e.g., a five year old boy), and preferences of the user (e.g., love teddy bears). According to the information related to the user, the robot head configuration unit 810 selects, at 930, a robot head from a plurality of selectable robot head and configures it as the robot head to be used to communication with the user. FIGS. 10A-10E illustrate various selectable heads of an automated dialogue companion, according to an embodiment of the present teaching. As illustrated, a robot head that can be dynamically configured for a user may include, but is not limited to, a duck head in 10A, a bear head in 10B, . . . , a pig head in 10C, a man's (or boy's) head in 10D, and a woman's (or a girl's) head in 10E. For example, if a user is known to love teddy bears, a robot head corresponding to a bear may be selected.

Figure 11C:
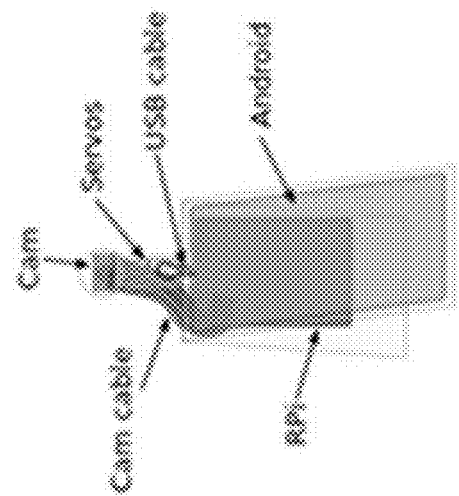
FIGS. 11A-11C illustrate an automated dialogue companion with its head being configurable and exemplary physical mechanism that enables the selectable head configuration, according to an embodiment of the present teaching.
Figure 11B:
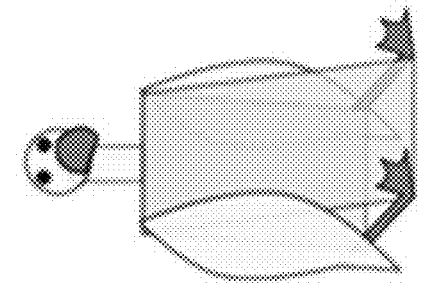
Figure 11A:
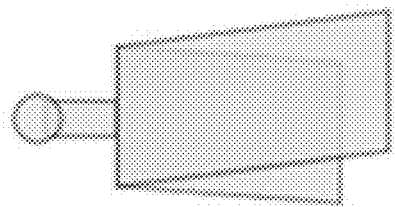

In some embodiments, what is selectable may be the head which is activatable on a robot body. FIGS. 11A-11C illustrate an automated dialogue companion with its head being selectable and exemplary physical mechanism that enables the selectable head configuration, according to an embodiment of the present teaching. Specifically, FIG. 11A illustrates a physical framework for an automated dialogue companion that may support selectable head configuration. In this framework, there is a stand formed by two rectangular surfaces, representing the body of the automated dialogue companion and a neck serving as a head support where a robot head may be mounted. FIG. 11B illustrates a duck head mounted on a dialogue companion with wings mounted on the support structure. FIG. 11C depicts exemplary physical components in the physical framework that are present to enable the operation of an automated dialogue companion that it supports. As shown, the front panel of the body may be used to place a device (of the user) when the user is in a dialogue session with the automated dialogue companion. The front panel may have sensors to sense the presence of the user device and to activate the robot. On the neck support portion of the physical framework, different physical components may be present to enable different operations. For example, there may a USB cable enabling storage of information, a camera which may be mounted on the neck portion to allow the robot head to see, a camera cable which enables the visual information acquired by the camera to be sent elsewhere (e.g., sent to the user interaction system 140 for backend processing), or a servo which can be controlled to move the head. Additional mechanisms may be deployed in order for the framework to host multiple selectable robot heads and activate a selected one each time when a selection is made. It is understood that the physical framework discussed herein for the automated dialogue companion is merely illustrative and does not limit the scope of the present teaching as discussed herein.

With the selected robot head, certain profile to be used to control the operation of the dialogue may also be configured based on what is known and/or what is observed about the user. For example, if the user is known (e.g., from previous dialogues) to do better when he/she is spoken to in a soothing voice in a British accent (e.g., because the mother of the user speaks that way), such information may be applied to configure the selected robot head with a profile that specify the speech style as with a soothing voice in a British accent. This is achieved by the profile configuration unit 830 which determines, at 940, an individualized robot head profile for the user.

Similarly, based on the user information such as identification, previously known information, and preferences, the program configuration unit 840 determines, at 950, an individualized program for the user. Such a determination may be based on, e.g., a program that the user has signed up, the age information of the user, or other known information about the user. A selected program is to be used to drive the conversation with the user. For instance, if the user signed up for a $5^{th}$ grade math program previously at a math club, the automated dialogue companion at the math club may have a record as to what program each user has signed up and a record on where the user is as opposed to the program from last dialogue session. Such information may be used when the same user appears at the club next time so that the automated dialogue companion may pick up from where it was left off and continue the program.

Based on the selected robot head, the robot profile, and the program, the interaction controller 850 conducts a dialogue with the user by controlling, at 960, the robot to interact with the user with content driven by the configured program. To enable dynamic adjustment of operational parameters, the interaction analyzer 855 collects sensor data about the user and the dialogue environment and analyzes, at 970, data about such human machine interactions. The sensor data may be in multiple modalities such as in audio, in visual, in text, or even haptic domains. Such sensor data may be acquired by a user device via which the user is interacting with the robot. Such sensor data may also be acquired by the robot agent (not shown), especially when the robot agent is in the same geographical location. Collecting the sensor data for analysis is to enable the performance assessment unit 860 in the automated dialogue companion 800 to assess, at 980, the performance of the user (or the robot agent). The assessment of the performance based on sensed interaction data may then be used by the adaptive learning engine 865 to learn, at 990, from the dialogue.

What is learned from the dialogue may form a basis for the adaptive configuration of various aspects of the automated dialogue companion. For example, if initial profile for a young boy is to use a soothing voice but during the dialogue it was recognized (via learning) that the boy does not pay any attention to what was said to him (e.g., does not turn his head to the robot and does not answer any question), such learned information may be used to feedback to the profile configuration unit 830 to change the profile to a more stern and louder voice to get the attention of the child. Similarly, in this case, the program that was initially configured may also be reconfigured to introduce some topic (e.g., talking about toys near the boy when it is observed that the boy is already playing with them) that may engage the user. In this case, the learned knowledge about that the boy is currently playing the toys in the room without paying attention to what is said to him may be fed to the program configuration unit 840. With such feedback, the profile configuration unit 830 and/or the program configuration unit 840 may then adjust, at 995, the configurations to accommodate the observed situations.

Figure 12A:
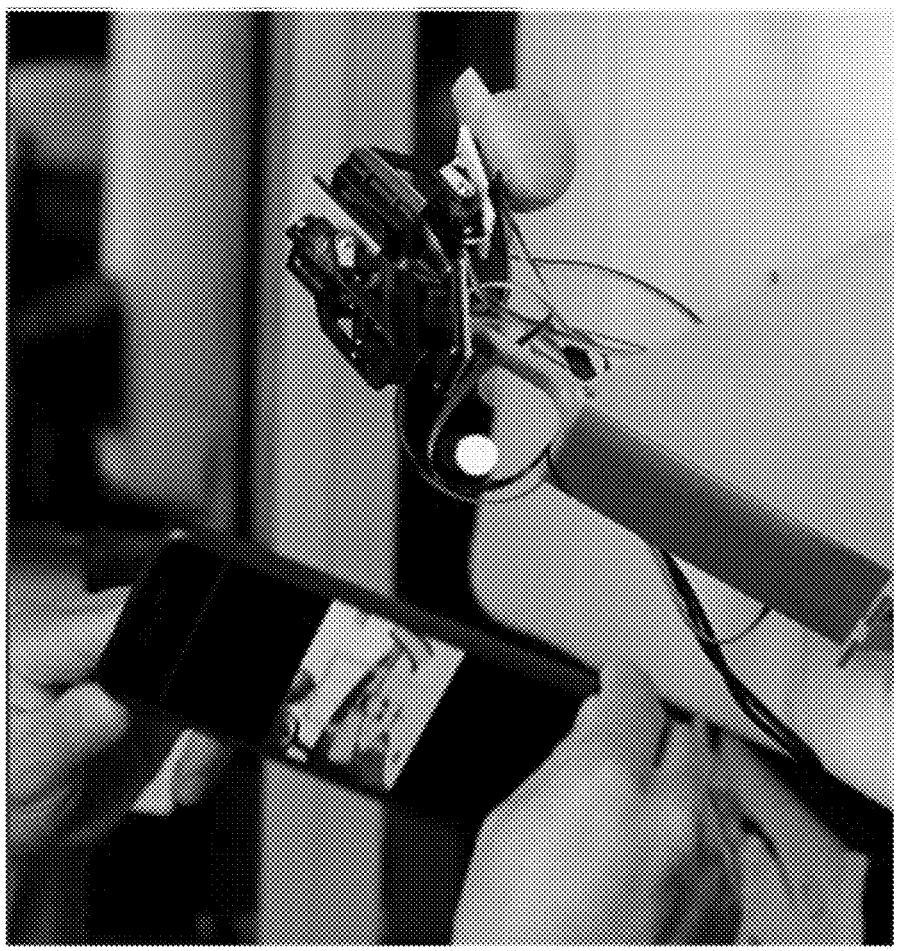
FIGS. 12A-12B illustrate the concept of proximity detection based head activation, according to an embodiment of the present teaching.
Figure 12B:
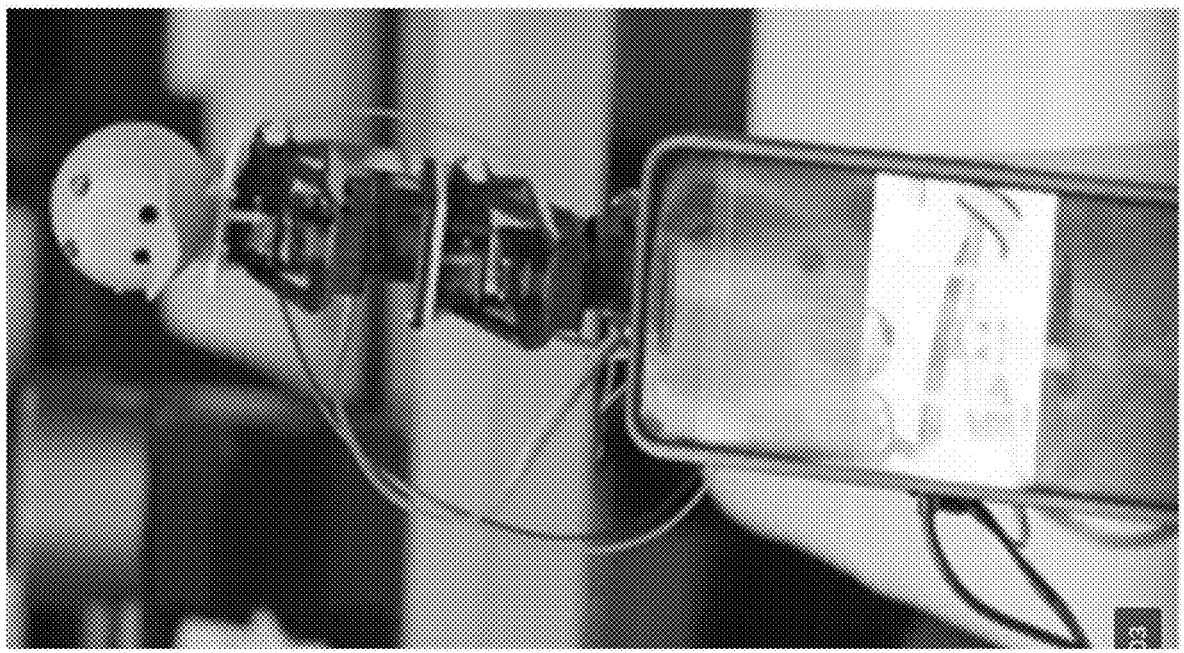
Figure 12C:
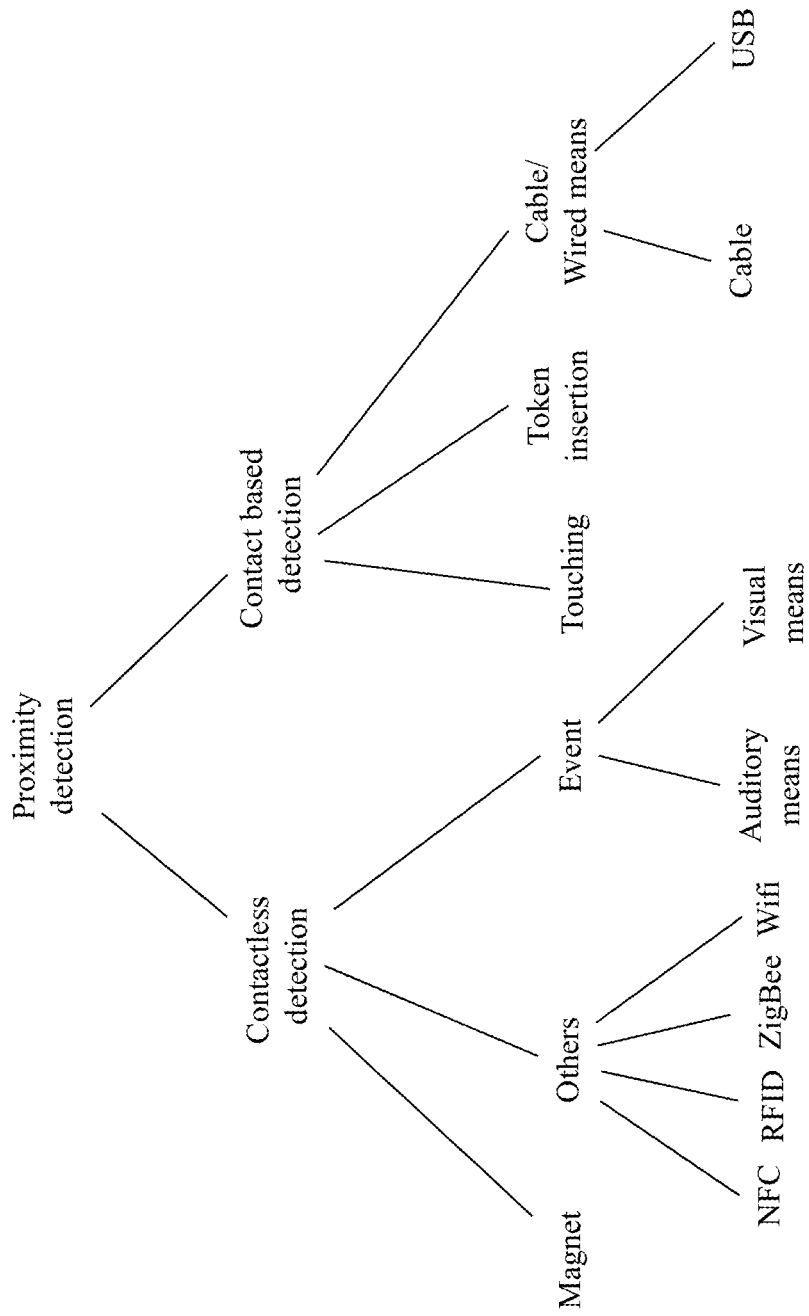
FIG. 12C illustrates exemplary means that an automated dialogue companion may deploy to detect proximity of a user, according to an embodiment of the present teaching.

FIGS. 12A-12B illustrate the concept of proximity detection based head activation, according to an embodiment of the present teaching. FIG. 12A shows an automated dialogue companion in an inactive mode, in which the robot head is down, i.e., not in an erected position. It also shows a user holding a user device is approaching the automated dialogue companion. FIG. 12B shows that once the user device is adequately close to the automated dialogue companion, the robot head is erected automatically because it detects that the user (or user device) is in proximity. To determine when the robot head of the automated dialogue companion is to be erected or activated, there are different ways to detect proximity of the user device. FIG. 12C illustrates exemplary means that an automated dialogue companion may deploy to detect proximity of a user, according to an embodiment of the present teaching. As shown, proximity detection may be via contactless means or contact means. For example, contactless detection may be performed via near field communication (NFC), Bluetooth, Zigbee, radio frequency identification (RFID), magnet, or Wi-Fi. In some embodiments, a device may detect proximity of a different party using the received signal strength indicator (RSSI) built into the IEEE 802.11 standard.

In some embodiments, contactless detection of proximity may be achieved by detecting certain event (event driven). For example, such contactless detection may be via a camera, infrared light, and/or a microphone receiving the acoustic information in the area. For example, an acoustic sensor may allow detection of an audio event (e.g., user says something) or a visual sensor such as a video recorder or a camera may enable detection of a visual event (e.g., observe that someone walking towards the automated dialogue companion). In some embodiments, such an event may be some action performed on the agent device. For example, a user may approach the agent device and mount his/her device on the agent device (see FIGS. 12A and 12B). In this case, the presence detector 805 may detect such a mounting event and infer proximity based on that.

In some embodiments, contact based proximity detection may be achieved by detecting a physical connection established via, e.g., touching, insertion of a token, or other types of electrical connection such as universal serial bus (USB) or via a wire, cable, or connector. For example, the agent device may be triggered when a user plugs in a USB into the agent device. In this case, the presence detector 805 detects the event of USB insertion.

In some embodiments, two devices (agent device and user device) may establish proximity with respect to one another through a communication channel. In some embodiments, signals generated by a magnetometer and/or an accelerometer may be used to detect whether a device (e.g., user device) is physically mounted to another device (e.g., agent device). In these embodiments, device A may have a magnet. For example, the agent device may be part of a stand (as shown in FIG. 12B) or a magnetic vehicle mount. In this example, when a user device is placed on or near the agent device, a change in a magnetic field may enable detection of a mount or proximity. As a consequence, as shown in FIG. 12B, the agent device is triggered and a robot head is activated (erected) to start a dialogue session. Similarly, via such means, the agent device may also detect an unmount event. Signals from an accelerometer may disambiguate an event (e.g., with respect to movement in a certain time period after detection of a change in the magnetic field or the event itself). In some embodiments, proximity is detected with respect to two devices. In other embodiments, proximity with respect to more devices may also be implemented. For example, one device may be able to detect proximity with respect to two or more other devices at substantially the same time.

Figure 12D:
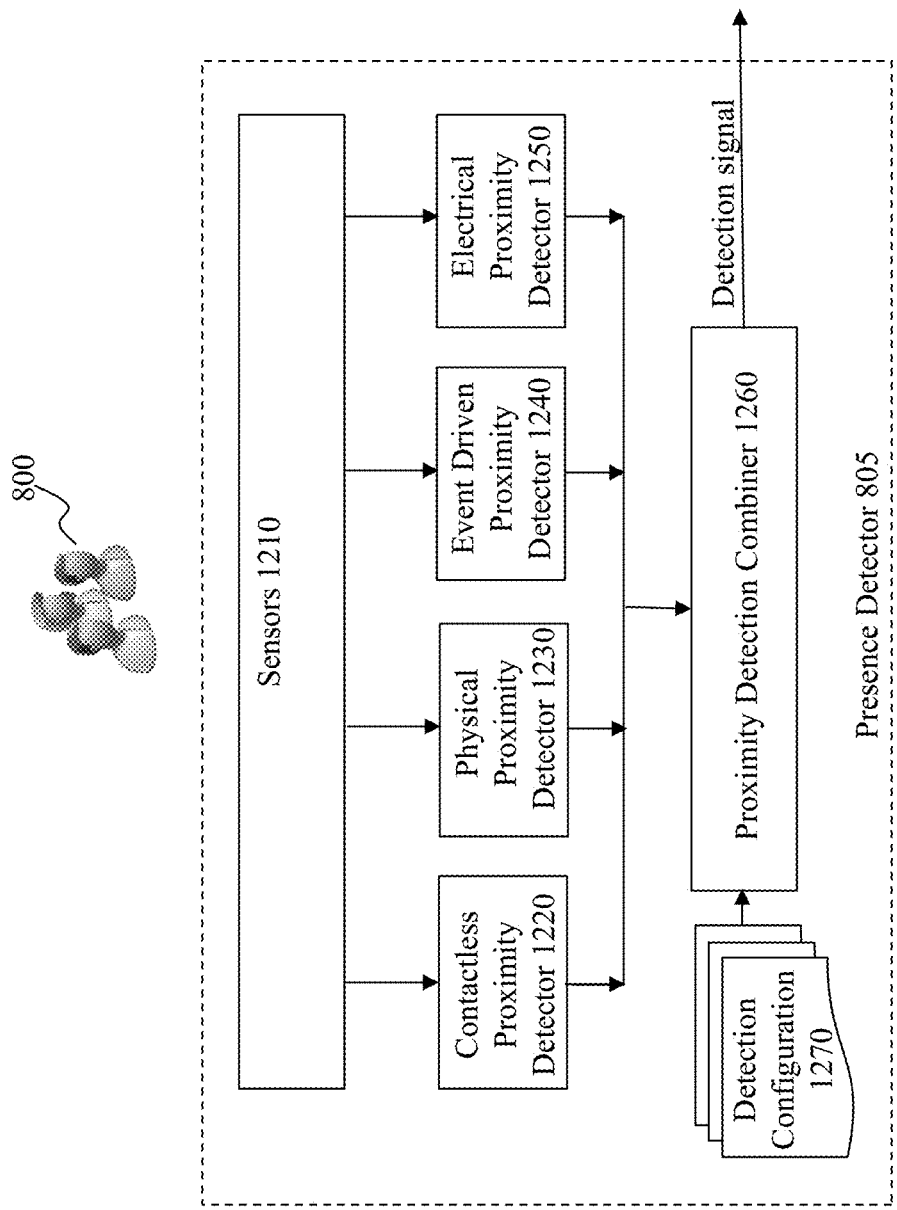
FIG. 12D depicts an exemplary high level system diagram of a presence detector for detecting proximity of a user, according to an embodiment of the present teaching.

FIG. 12D depicts an exemplary high level system diagram of the presence detector 805, according to an embodiment of the present teaching. In this illustrated embodiment, the presence detector 805 comprises a contactless proximity detector 1220, a physical proximity detector 1230, an event driven proximity detector 1240, and an electrical proximity detector 1250. To support different modes of operation to detect proximity of user, the presence detector 805 deploys various sensors 1210 therein. In some embodiments, the presence detection 805 may also include a detection configuration 1270 which may specify which mode or modes is configured to operate. In some situation, the configuration 1270 may specify a specific mode of operation for a deployed presence detector. For instance, if an automated dialogue companion is installed in a crowded and noisy place (e.g., lobby of a hotel), as it is more difficult to do event driven proximity detection in such an environment, the configuration 1270 may be set to use magnet or NFC approach to detect proximity.

In some embodiments, the presence detection may detect that two devices are physically close to one another. For example, proximity may be detected when two devices (one is the agent device representing the automated dialogue companion and the other is a user device) are physically within a particular range from one another. The range may be on the order of millimeters, centimeters, tens of centimeters, or a few meters (e.g., when a magnet approach is used). In some embodiments, proximity may be detected when the two devices physically touch one another. In some embodiments, the presence detector 805 may also be configured to detect that the two devices are out of a specific range from one another.

Based on configured mode of operation and deployed sensors 1210, any of the detectors 1220-1250, once configured to operate, may be continually kept on for detection purposes. For example, the proximity event detector 1240 may be configured to continually listen or observe what is in the nearby environment based on, e.g., audio and video/image information acquired by acoustic and visual sensors. Each of the detectors may detect the proximity of a user in their respective designated means and detection results from different detectors may then be sent to a proximity detection combiner 1260, which may then combine results from different detectors, e.g., based on some integrations models, to generate an integrated detection signal. Such a signal indicates presence of a user in the vicinity and thus triggers the automated dialogue companion.

In some embodiments, the presence detector 805 may signal in some manner the detected user proximity. For example, the presence detector 805 may or may not indicate proximity. In signaling detected user proximity, the presence detector 805 may do so via a light, a sound, a haptic/tactile indication, and/or by any other sensory means. In some embodiments, when proximity is detected, the user device of the detected user may also be configured to indicate the proximity with an automated dialogue companion. For example, when the proximity is detected, the automated dialogue companion may send a signal to an application running on the user device instructing it to signal the user, e.g., that a dialogue session with the agent device is about to begin.

As shown in FIG. 8, once the presence of a user is detected, the presence detector 805 invokes the robot head configuration unit 810, the profile configuration unit 830, and the program configuration unit 840. The robot head configuration unit 810 will select, based on information related to the user, a robot head from a plurality of robot heads (820) as illustrated in FIGS. 10A-10E. The profile configuration unit 830 will configure a profile for the selected robot head that is appropriate for the detected user (e.g., profile dictating the speech style of the robot), and the program configuration unit 840 will select, with respect to the detected user in the area, an appropriate program that drives the dialogue between the automated dialogue companion and the user.

Figure 13A:
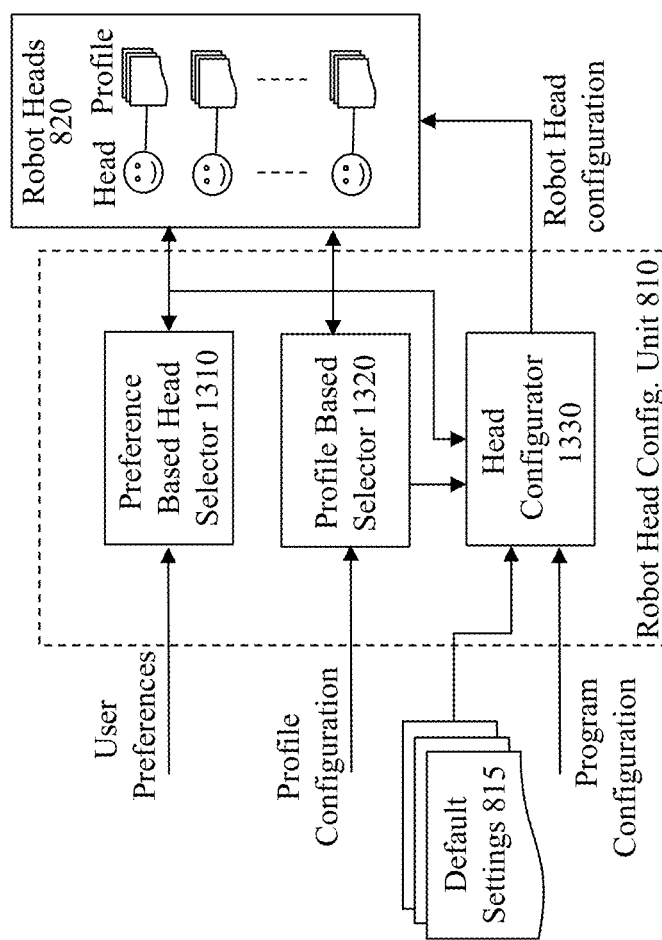
FIG. 13A depicts an exemplary high level system diagram of a robot head configuration unit, according to an embodiment of the present teaching.

FIG. 13A depicts an exemplary high-level system diagram of the robot head configuration unit 810, according to an embodiment of the present teaching. In this illustrated embodiment, the robot head configuration unit 810 comprises a preference based head selector 1310, a profile based selector 1320, and a head configurator 1330. It is seen in FIG. 8 that the robot head configuration unit 810 takes input from multiple sources in order to configure the robot head. According to the present teaching, a robot head is selected based on different types of dynamic information. It may consider the preferences of the user detected in the area. It may consider the profile associated with each robot head. For instance, a duck robot head may have a profile specifying that it is for children instead of adults. In some embodiments, the selection of a robot head may also be based on a profile dynamically configured for the user observed by the profile configuration unit 830. For instance, if the user is observed to be in a sad mood, the profile configuration unit 830 may configure a profile for a cheerful voice to cheer up the user. In this case, the head selection may need to be made consistent.

To accommodate different considerations, the robot head configuration unit 810 may receive input from different sources. As depicted, it receives default setting information from the default settings 815, user preferences from the user database 130, the profile configuration from the profile configuration unit 830, and the program configuration from the program configuration unit 840. A default setting may be used when there is no other information that can be used to determine a robot head selection. Based on information from different sources, a robot head is to be configured to be activated (with a certain dynamically configured profile) for carrying out a dialogue with the user.

Figure 13B:
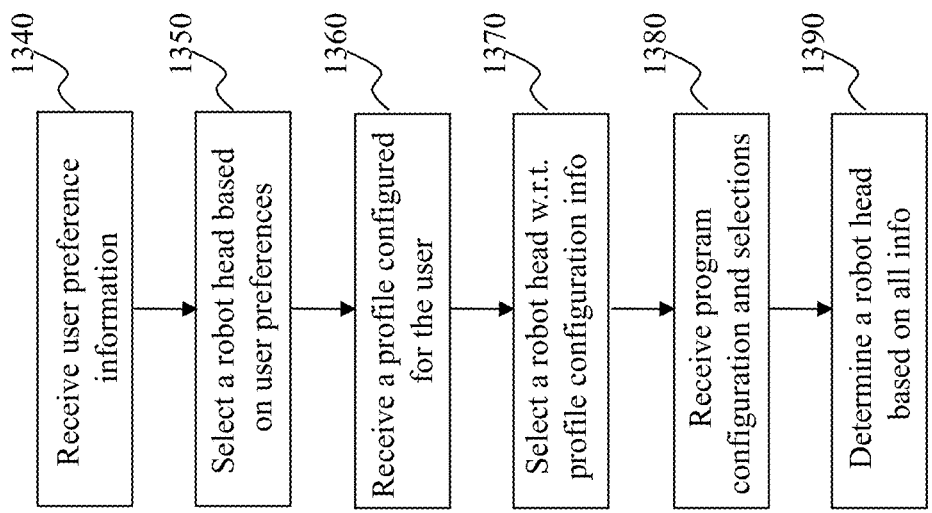
FIG. 13B is a flowchart of an exemplary process of a robot head configuration unit, according to an embodiment of the present teaching.

FIG. 13B is a flowchart of an exemplary process of the robot head configuration unit 810, according to an embodiment of the present teaching. The preference based head selector 1310 receives, at 1340, user preference information from the user database 130 and selects, at 1350, a robot head based on user's preferences. A user may be known to prefer a rabbit head and such information is to be used to select a robot head. At the same time, a selection may also be made based on, a preferred profile configured for the user. This is achieved by the profile based selector 1320. For example, if the user appears to be sad, a profile with cheerful voice may be configured and a robot head consistent with that profile may be selected. At 1360, the profile based selector 1320 receives information related to a profile configured (e.g., from the profile configuration unit 830) for the user and selects, at 1370, a robot head accordingly. To integrate different selections in light of the program to be applied to the dialogue, the head configurator 1330 receives, at 1380, program configuration information and the selections made by both the preference based head selector 1310 and the profile based selector 1320 and generates, at 1390, a robot head configuration by integrating the selections based on preferences and profile. Such a configuration incorporates the profile configuration and program configuration and can be used by the interaction controller 850 to proceed with the dialogue with the user.

Figure 14A:
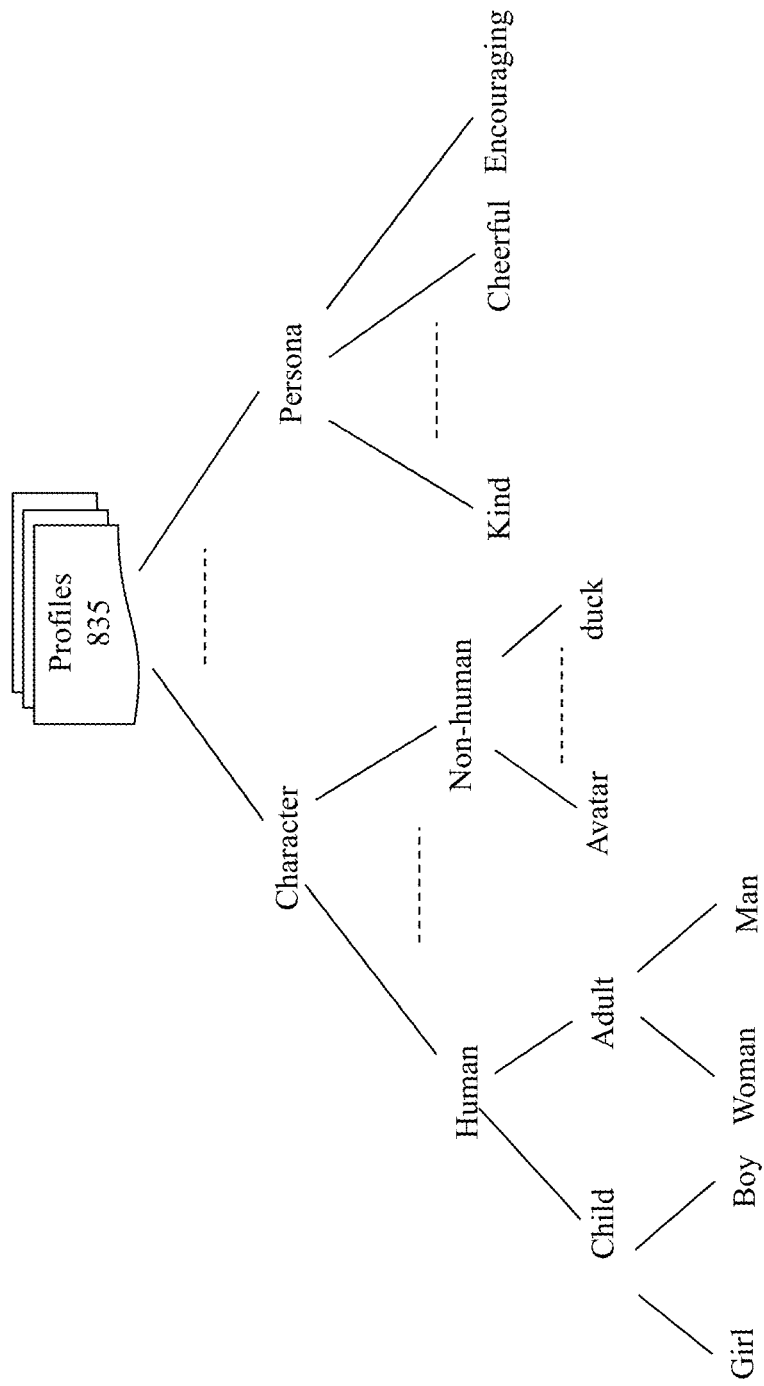
FIG. 14A illustrates exemplary aspects of a robot profile, according to an embodiment of the present teaching.

The profile based selector 1320 operates based on a profile configuration, which is generated by the profile configuration unit 830, which selects a specific profile for a current user based on selectable profiles stored in storage 835, as shown in FIG. 8. The selectable profiles stored in 835 may be a pre-determined set of profiles, which may be updated over time based on, e.g., performance assessment when such profiles being used in dialogues. Selectable profiles may be initially set up to be directed to certain anticipated characters with a set of anticipated emotions. FIG. 14A illustrates exemplary aspects of a robot profiles, according to an embodiment of the present teaching. As discussed herein, profiles for a selected robot head of the automated dialogue companion are different ways for the agent device (part of the automated dialogue companion) to carry out the dialogue, including how to act, how to speak, with what expressions. Such communication style parameters may be related to or determined by the underlying character the automated dialogue companion is, the role of the character, . . . , and the persona the agent device is to project to the user.

As shown in FIG. 14A, the profiles stored in 835 may include ones that are for a plurality types of characters, each operating with a different persona. For example, different profiles may be set up for different types of characters such as a human or a non-human character. A human character may correspond to a person who can be a child, which may be a boy or a girl, or an adult, which may be a man or a woman. The character may also include a non-human actor such as an avatar, . . . , a duck, or any of the animal characters shown in FIG. 10. Each character profiled may be associated with certain persona that is to be projected to the user via the character during the dialogue. Each character may be associated with one or more of available personas such as the persona of being a kind character, . . . , a cheerful character, and an encouraging character. Such profiles may be indexed based on characterizations in different dimensions. In some embodiments, additional characteristics may also be included to enable a wider range of selectable profiles. For instance, in addition to the combination of character and persona, profession may also be a dimension that can be used in conjunction with character and persona in defining profiles.

While profiles may be indexed based on a combination of characteristics in different dimensions, as discussed herein, to instantiate the intended characteristics associated with each profile, the profile may include various precise specifications directed to different aspects of the dialogue in order to implement the persona of the underlying character. For example, if a profile is for an agent device to act as a boy with a cheerful persona, various operational parameters need to be provided in order to control the agent device to act in a way that projects it as a cheerful boy.

Figure 14B:
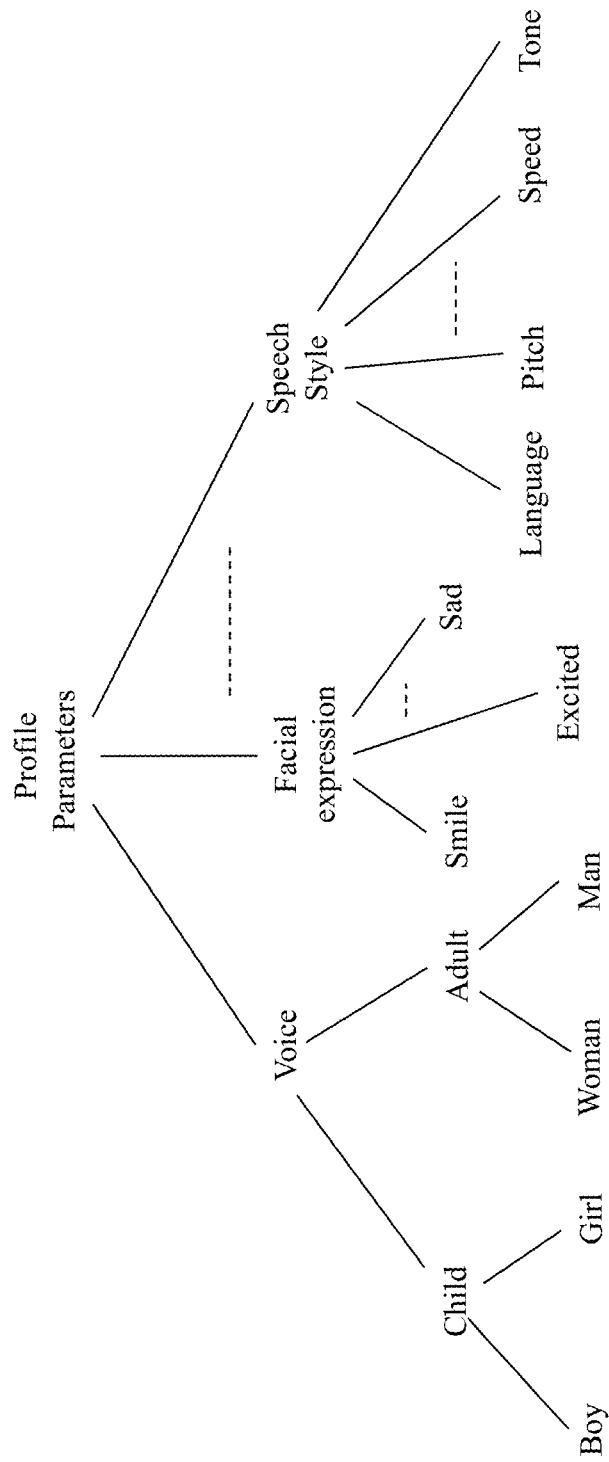
FIG. 14B illustrates exemplary types of parameters specified in a profile to implement an automated dialogue companion character with a certain persona, according to an embodiment of the present teaching.

FIG. 14B illustrates exemplary types of parameters that can be specified in a profile to implement a character with a certain persona, according to an embodiment of the present teaching. As illustrated, to allow the automated dialogue companion to implement a character with a certain persona, a profile may specify parameters of the agent's voice, facial expression, . . . , and/or speech style. An agent's voice may be controlled to be the voice of a child or an adult. For a child character, it may be further specified as to whether to have a boy or girl's voice. For an adult character, it may be specified to implement either a woman's or a man's voice. For each type of voice specified, there may be a pre-programmed set of parameters that can be used to generate, e.g., speech signals converted from text response for the agent device.

In addition to voice, which may be determined based on the character, other parameters may also be specified in connection with the persona to be implemented. For example, facial expression and speech style may be controlled to convey a certain selected persona of the agent while interacting with the user. Parameters specified in the profile are to be used for the automated dialogue companion to render the speech of the responses to be "spoken" by the agent device and/or the expression to be rendered on a display screen corresponding to the face of the agent. For instance, the parameters specified in a profile may dictate which language the agent is to use, what pitch is to be used to speak the responses, the speed at which the agent is going to speak, . . . , or what would be the tone that the agent is going to speak. A profile may also incorporate parameters related to facial expression, e.g., smile, excited, or sad with specifics that can be used for rendering such expressions. The profile storage 835 may store profiles with different combinations of characters and personas so that the profile configuration unit 830 may make a selection in accordance with information known about the user.

In some embodiments, the profiles stored in 835 may also be classified in accordance with emotions that the profiles are appropriate to address. For example, certain profiles may be classified as suitable for a user who is sad and needs to be cheered up. Some profiles may be classified as suitable for a user who is frustrated. With each classification, there may be multiple profiles corresponding to different combinations of characters and personas. For example, if a class of profiles that are classified as suitable to be used to interact with a child who is frustrated may include profiles corresponding to a yellow duck head with a cheerful voice, a pink rabbit head with a soft and soothing voice, etc. so that when faced with a child user who is frustrated, an appropriate profile may be selected from a plurality of profiles in the class associated with emotion "frustrated" based on, e.g., user preference (e.g., the child is known to love rabbits).

Figure 15A:
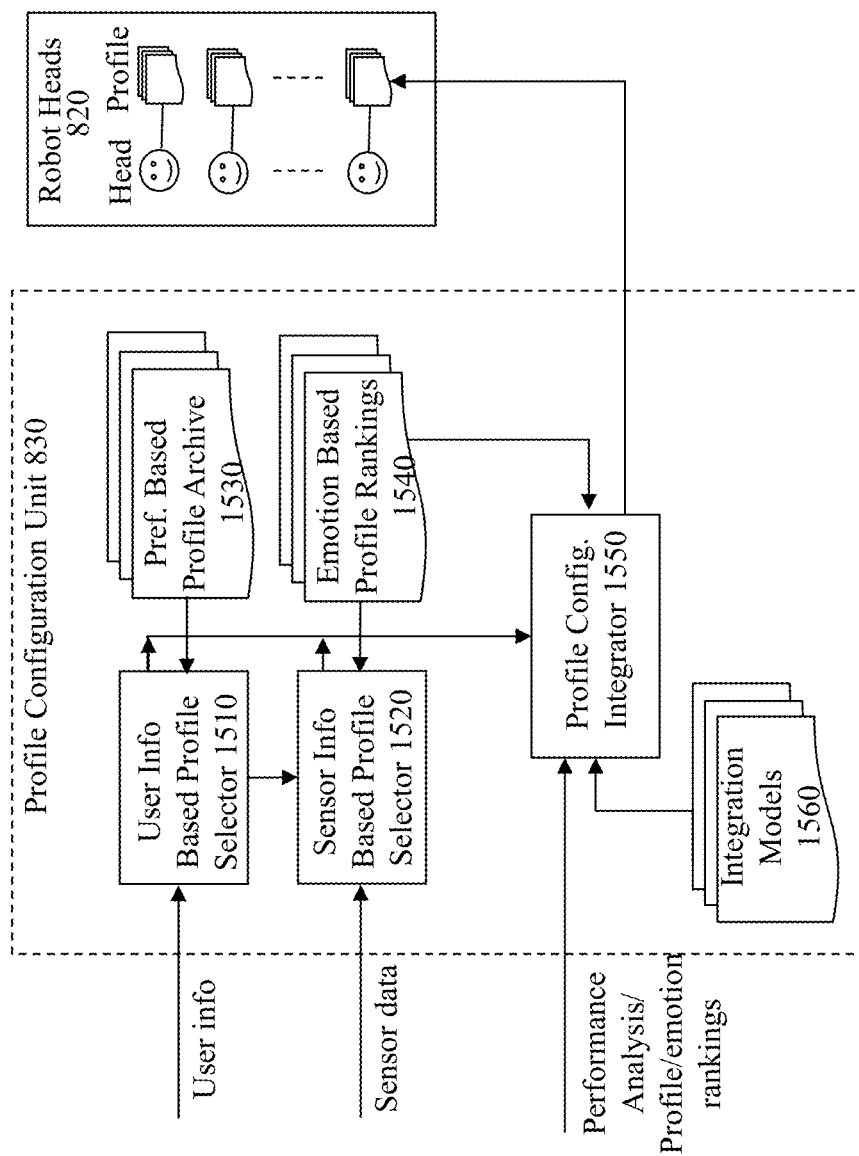
FIG. 15A depicts an exemplary high level system diagram of a profile configuration unit, according to an embodiment of the present teaching.
Figure 15B:
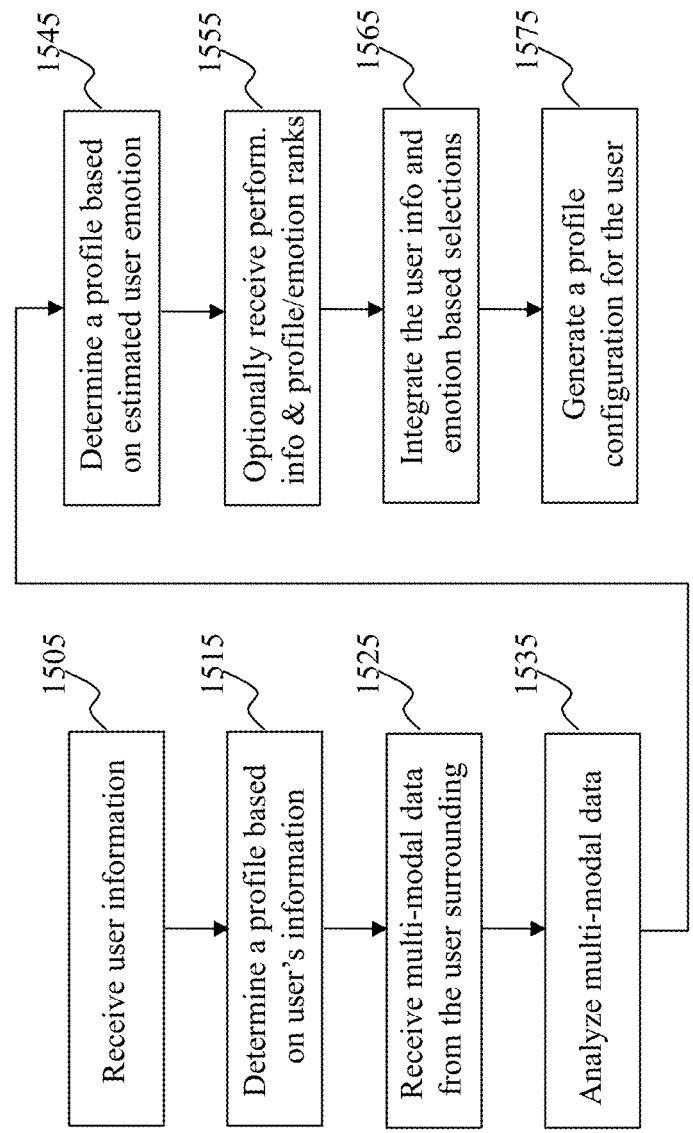
FIG. 15B is a flowchart of an exemplary process of a profile configuration unit, according to an embodiment of the present teaching.

FIG. 15A depicts an exemplary high level system diagram of the profile configuration unit 830, according to an embodiment of the present teaching. In this illustrated embodiment, the profile configuration unit 830 comprises a user information based profile selector 1510, a sensor information based profile selector 1520, and a profile configuration integrator 1550. In this exemplary embodiment, the profile configuration unit 830 allows selection of a profile based on information from different sources and combines different choices, if any, to consolidate to derive a suitable profile for the detected user. FIG. 15B is a flowchart of an exemplary process of the profile configuration unit 830, according to an embodiment of the present teaching. The user info based profile selector 1510 receives, at 1505, user information, e.g., user's identification, personal information such as age, gender, and preferences. Based on the received user information, the user info based profile selector 1510 may determine, at 1515, a candidate profile based on information related to the user. For example, if the user is a toddler who is known to be shy and prefers to speak to people who speak softly, a profile classified as to be suitable to interface with a shy child with a soft voice may be selected. Such a selection may be made using information stored in a preference based profile archive 1530, that may store all profiles grouped based on different user preferences. For example, there may be profiles for children who are shy and prefer to communicate with a person who is soft spoken.

In some embodiments, the profile configuration unit 830 may also select a candidate profile based on different criteria, e.g., the current dialogue setting of the user, including a state of the user, surroundings of the user, sound in the scene, etc. An assessment of the current dialogue setting may be based, e.g., on sensor information acquired via different sensors from the dialogue scene. The sensor information based profile selector 1520 receives, at 1525, sensor data acquired from the user's surrounding and analyzes, at 1535, such sensor data. In some embodiments, the received sensor data is in multiple modalities providing, e.g., images/videos, sound (including speech or environment sound), texts, or even haptic information. Analyzing such information may be for understanding the situation relevant to the selection of a profile. For instance, via sensor data, it may be observed that the child user is crying and there is a toy duck on the desk in the room. Such a situation may affect the selection of a profile. For instance, if the user is normally pretty loud and cheerful and generally a normal profile would suffice but the user is crying now and thus the situation requires a profile with a soothing or comforting voice and a smiling face. In this case, the sensor info based profile selector 1520 may determine, at 1545, to select a profile with soothing and comforting voice based on, e.g., emotion based profile rankings stored in 1540. As discussed herein, profiles may be classified based on emotion, i.e., for each emotion, there may be one or more profiles associated therewith. In this example, if the emotion of the boy user is sad (i.e., an emotion), a candidate profile may be selected from one or more profiles that are classified to address "sad" emotion, e.g., based on rankings of the profiles. That is, the rankings may indicate how suitable a profile is to address an emotion. Such rankings may be updated by the adaptive learning engine 865 (see FIG. 8) in accordance with the assessment of performances of different dialogues. For example, if a profile is being linked to emotion "sad" but in performance, the percentage of times that profile, when being deployed, did not seem to ease a user's "sadness" according to the assessment from the performance assessment unit 860. In that situation, the adaptive leaning engine 865 may learn from the assessment and provide feedback to adjust the profile/emotion ranking.

In some situations, the selection made by the user info based profile selector 1510 may differ from that made by the sensor info based profile selector 1520. In this situation, the profile configuration integrator 1550 may either combine the selections or select one of the candidate profiles as the configured profile based on additional information. In some embodiments, such additional information may include performance analysis or profile/emotion rankings. When the profile configuration integrator 1550 receives, at 1555, the performance analysis result and/or the current profile/emotion ranking information, it integrates, at 1565, the selections from 1510 and 1520 and generates, at 1575, a profile configuration for the user to be involved in the current dialogue. In some embodiments, the integration may be to select one of the candidate profiles. In some embodiments, the integration may be to combine (e.g., by mixing) the parameters from the two candidate profiles to create a new profile for the user.

Figure 16A:
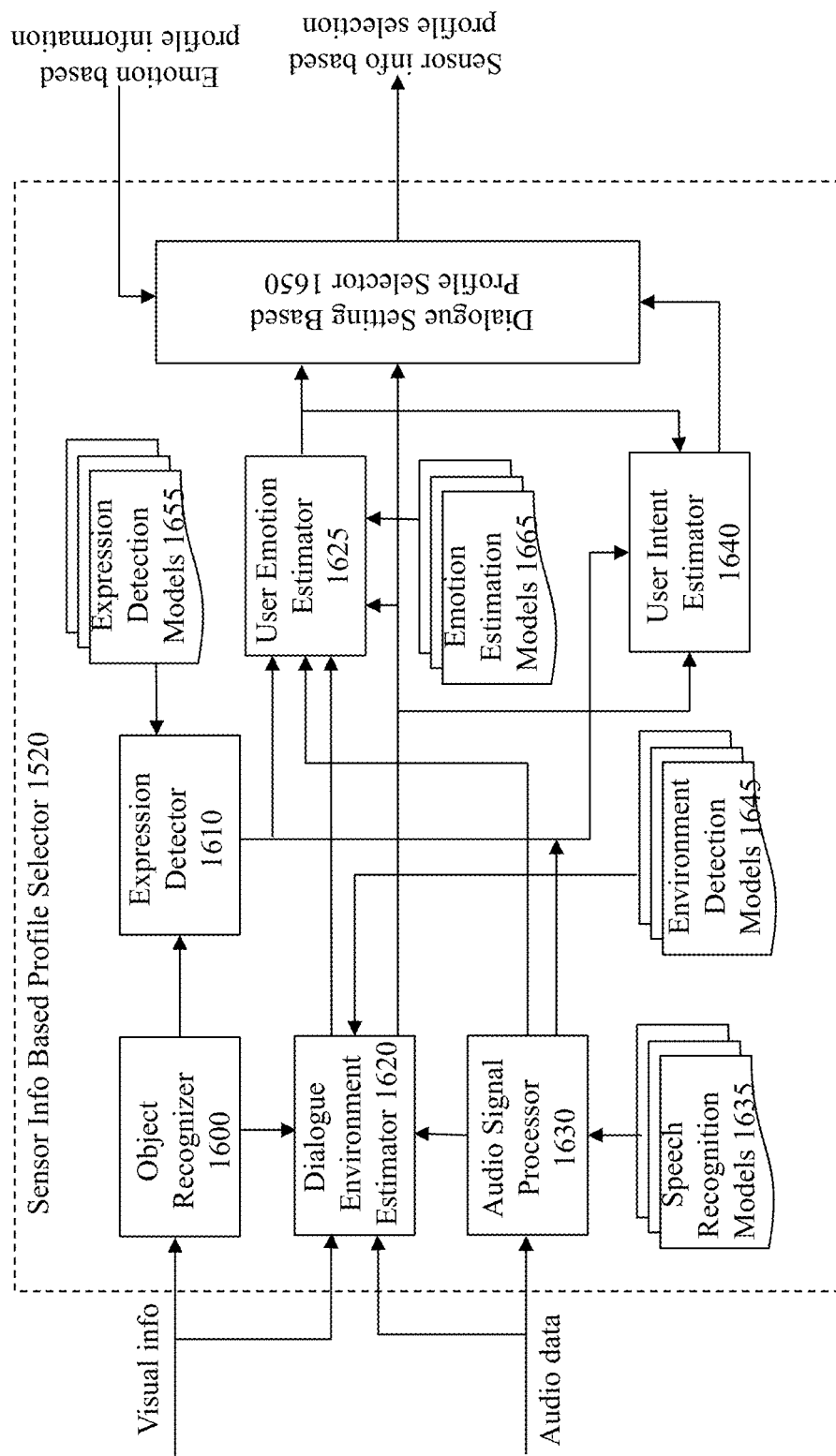
FIG. 16A depicts an exemplary high level system diagram of a sensor info based profile selector, according to an embodiment of the present teaching.

As shown in FIG. 15A, to obtain a profile suitable for the current user, the sensor info based profile selector 1520 in the profile configuration unit 830 is utilized for selecting a profile that is considered appropriate for the user given input from sensor(s) capturing the state of the user as well as the surround of the dialogue environment, according to the present teaching. This is for adapting the profile selection to the dynamic situation of the dialogue so that the automated dialogue companion may enhance the engagement of the user. FIG. 16A depicts an exemplary high level system diagram of the sensor info based profile selector 1520, according to an embodiment of the present teaching. In this illustrated embodiment, the sensor info based profile selector 1520 is configured to estimate the state of the user well as the environment of the dialogue based on process multimodal sensor input such as visual and audio inputs. Input in other modalities may also be used (even though not shown in FIG. 16A) for the same purposes. For example, haptic information may be acquired and used to estimate the user's movement. Text information may also be used, if present, to facilitating the understanding of the dialogue environment.

As shown in FIG. 16A, in the exemplary embodiment, the sensor info based profile selector 1520 includes an object recognizer 1600, an expression detector 1610, a user emotion estimator 1625, a user intent estimator 1640, an audio signal processor 1630, a dialogue surround estimator 1620, and a dialogue setting based profile selector 1650. In accordance with the present teaching, the state of a user may include the emotional state of the user and the estimated intent of the user, which may be estimated based on, e.g., user's facial expressions, user's acoustic expressions which can be verbal or merely some sound that the user made. Intent may be estimated in some situations based on the estimated emotion. For instance, when a user appears to be very excited and continues talking about the game he just played and won, it may be estimated that the user does not intend to start a dialogue on math in a short time. In this case, a temporary program may be selected for the agent device to continue to chat a bit with the user on his/her win and the profile for that conversation may be selected to deliver the conversation in a cheerful and exciting tone.

The dialogue environment estimation may be also important to the profile selection. For example, if the dialogue environment estimator 1620 detects that the environment is noisy via, e.g., audio signals, such information may be used to select a profile that specifies to deliver speech using a bright and loud voice so that the user can hear it. In addition, such detection result from the dialogue environment estimator 1620 may also be considered by the emotion estimator 1625 and/or the user intent estimator 1640 when estimating the mental state of the user. For example, if the environment is noisy, even though the user may be loud, it may be due to the fact that the user has to speak loudly in order for others to hear and not necessarily because the user is upset.

Figure 16B:
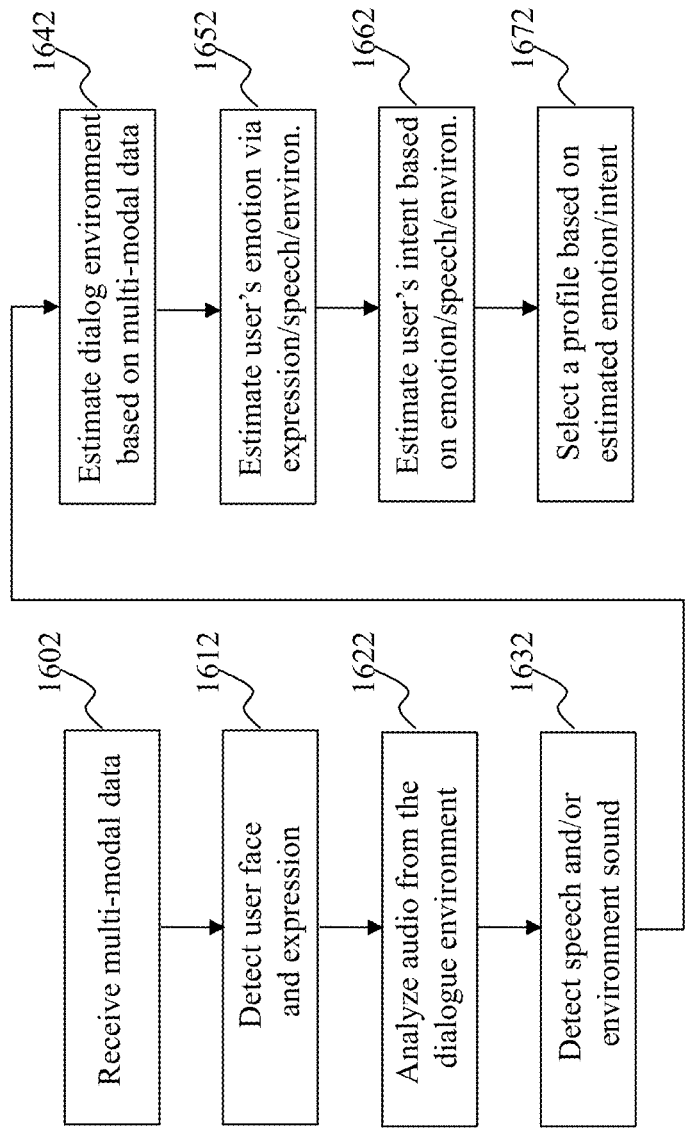
FIG. 16B is a flowchart of an exemplary process of a sensor info based profile selector, according to an embodiment of the present teaching.

FIG. 16B is a flowchart of an exemplary process of the sensor info based profile selector 1620, according to an embodiment of the present teaching. At 1602, the multimodal sensor data is received and further used by various components to detect relevant information, for example, at 1612, the object recognizer 1600 detects, from the video input data, various objects present in the dialogue scene such as the user's face. Based on detected face of the user, the expression detector 1610 may further detect, based on appropriated models learned via machine learning, an expression of the user. In the meantime, other detected objects, such as a chair, a desk, a computer on the desk, and a toy duck on the chair, may be sent to the dialogue environment estimator 1620 to assess, e.g., the nature of the environment.

To assess the user's state and the dialogue environment, the sensor info based profile selector 1520 may also consider audio data acquired in the dialogue environment. The audio signal processor 1630 may analyze, at 1622, the audio signal from the environment and detects, 1632, either speech (of the user) and/or environment sound(s) (e.g., siren in the background) from the audio data. Based on both visual objects detected by the object recognizer 1600 and/or the audio events detected by the audio signal processor 1630, the dialogue environment estimator 1620 estimates, at 1642, the nature of the environment. For instance, if chair, desk, and computer are detected to be present in the dialogue scene (by the object recognizer 1600) and the sound of siren is detected (by the audio signal processor 1630), the dialogue environment estimator 1620 may estimate that the dialogue environment is an office in some city.

To adapt the profile selection to the user state, the user emotion estimator 1625 estimates, at 1652, the emotion of the user based on, e.g., the user's expression, either via visual expression on the face or via audio (e.g., speaking something or making some expressive sounds). In some embodiments, a user's emotion may also be estimated based on relevant information about the environment that user is in. As discussed herein, for instance, while a user may be estimated as being upset when the user speaks loudly in a quiet environment, the user may not be considered as being upset when the speech is uttered in a noisy environment. Based on the estimated emotion, speech, and environment, the user intent estimator 1640 may then estimate, at 1662, the intent of the user. After the user state and the environment are estimated, the dialogue setting based profile selector 1650 selects, at 1672, a profile that is considered to be appropriate to the user in the current dialogue environment. As discussed herein, the dialogue setting includes various conditions observed in the dialogue environment, e.g., the state of the user, the objects present in the environment, characteristics of the environment (e.g., how noisy), ..., etc.

Profile configuration may be made adaptive during a dialogue. For example, a child user may be known to prefer a soft and soothing female voice and a profile is selected that enables speech delivery in a soft and soothing female voice. During the dialogue, it may be observed that the user does not listen to and follow instructions and hence, does not perform well. In this situation, the interaction performed is analyzed on-the-fly (see interaction analyzer 855 and performance assessment unit 860 in FIG. 8) and the automated companion may learn the poor performance. Such performance information may be sent to the adaptive learning engine 865 which may determine, based on models generated via machine learning based on past data, that a more assertive voice is needed to get attention from the user. In this case, the adaptive learning engine 865 may invoke the profile configuration unit 830 to adjust the profile selection. This is shown in FIG. 15A, where the profile configuration integrator 1550 takes the performance analysis information into consideration and may then adjust the profile selection.

As also shown in FIG. 15A, the profile configuration integrator 1550 may also consider profile/emotion ranking information in determining how to configure or generate a profile. As discussed herein, each profile may be classified as appropriate or relevant for a user exhibiting different emotions. For each emotion, how appropriate a profile is to handle a user in that emotional state may be reflected in its profile/emotion ranking score. Such a score may also be used for the profile configuration integrator 1550 to determine which profile is to be configured for a user.

Figure 17A:
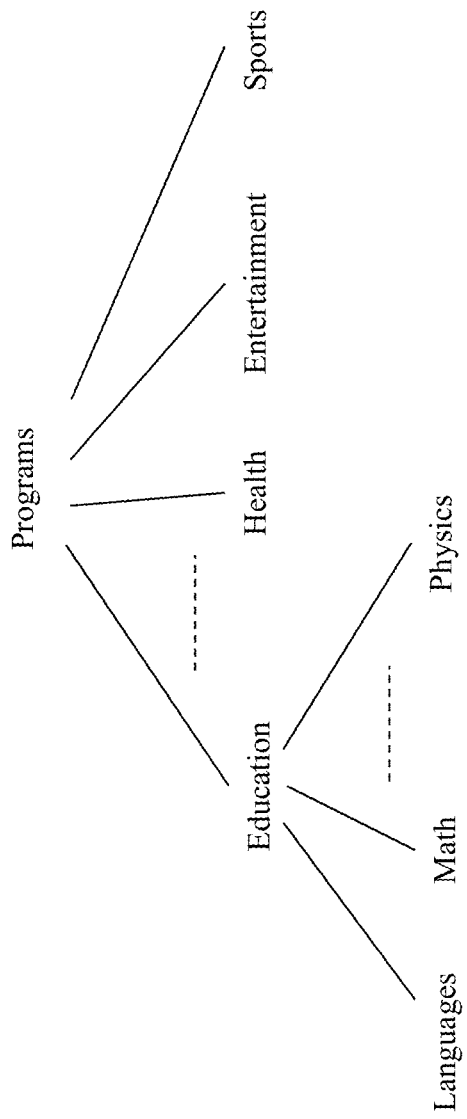
FIG. 17A illustrates exemplary types of programs that can be used to drive an automated dialogue companion, according to an embodiment of the present teaching.

In addition to selecting an appropriate profile that goes along with a selection of a robot head, the automated dialogue companion may also adaptively configure a program that is to be used to drive the conversation with the user. As shown in FIG. 8, the program configuration unit 840 is to configure a program adaptively based on the current dialogue setting, including who is the user, what is the user's state, and what is the environment. FIG. 17A illustrates exemplary types of programs that can be used by an automated dialogue companion to drive a conversation with a user, according to an embodiment of the present teaching. A program is related a subject or topic, as shown in FIG. 17A, which may be related to education, health, . . . , entertainment, sports, or others. On each subject, there may be more finely classified topics, e.g., education may include sub-topics on languages, math, . . . , physics. Although FIG. 17A illustrates relatively few topics, a content taxonomy tree used in other context may be adopted herein, depending on what an automated dialogue companion is equipped with.

As discussed herein, a user appearing in a dialogue environment may trigger the activation of the automated dialogue companion. When that occurs, there may be several possibilities. For example, a user may be a pre-registered user on certain subjects (e.g., math lessons). In this situation, a default program to be configured to start a dialogue with the user may correspond to what was pre-registered. The default program may be adjusted in terms of where the program was terminated during a previous dialogue. For example, if a user signed up with the automated dialogue companion for $5^{th}$ grade math program and last conversation covered the subject of triangle in geometry, then the current conversation may start with a review of the triangle before proceeding to talk about rectangles. In this scenario, the program selected is for driving a task oriented conversation, where the tasks involved are related to the goal that the program is to achieve. For example, tasks orientated conversation related to a $5^{th}$ grade math program is to go through different tasks in the program aimed at teaching a user and to learn $5^{th}$ grade math.

In a different situation, the user appears in the scene may be new to the automated companion. In this case, the program selected may correspond to one designed to start a conversation with a new user. For an automated companion configured for teaching children, such an initialization program may be designed to ask the user various questions to understand, e.g., the age of the user, the grade level, the level of the math the user is comfortable with, etc. in order to help the user to sign up for a program that is appropriate in the subject matter interested.

Figure 17B:
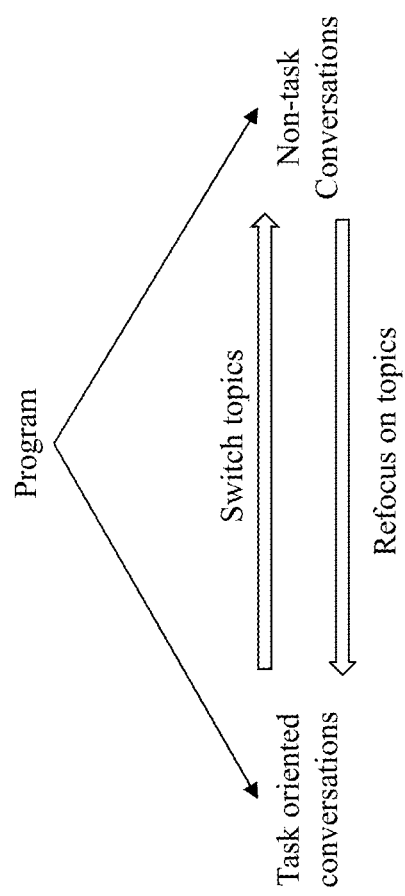
FIG. 17B illustrates the concept of adaptive switching between program-drive and non-program-driven conversations based on feedback from a dialogue, according to an embodiment of the present teaching.

In some situations, although a program may initially be selected to drive a task oriented dialogue, the initially selected program may need to be switched out in order to continue to engage the user. In this case, an alternative program or conversation may be adaptively selected to carry on a non-task oriented conversation with a user. For example, a user may have pre-registered with $5^{th}$ grade math program so that when the user is detected, the $5^{th}$ grade math program is configured to drive the task oriented dialogue. However, during the conversation, it may be observed that the user is not engaging with the automated companion. In this situation, the automated companion may temporarily suspend the initially selected program and switch topics to talk with the user on non-task orientated subject (which may be determined, e.g., based on likings of the user or something present in the scene that the user may be interested). The automated companion may continue to observe the user until the engagement is observed. In that case, the dialogue may switch back to the originally configured program and refocus the user on task orientated conversations. This is shown in FIG. 17B, which illustrates the concept of adaptive switching between program-drive and non-program-driven conversations based on feedback from a dialogue, according to an embodiment of the present teaching.

Figure 18A:
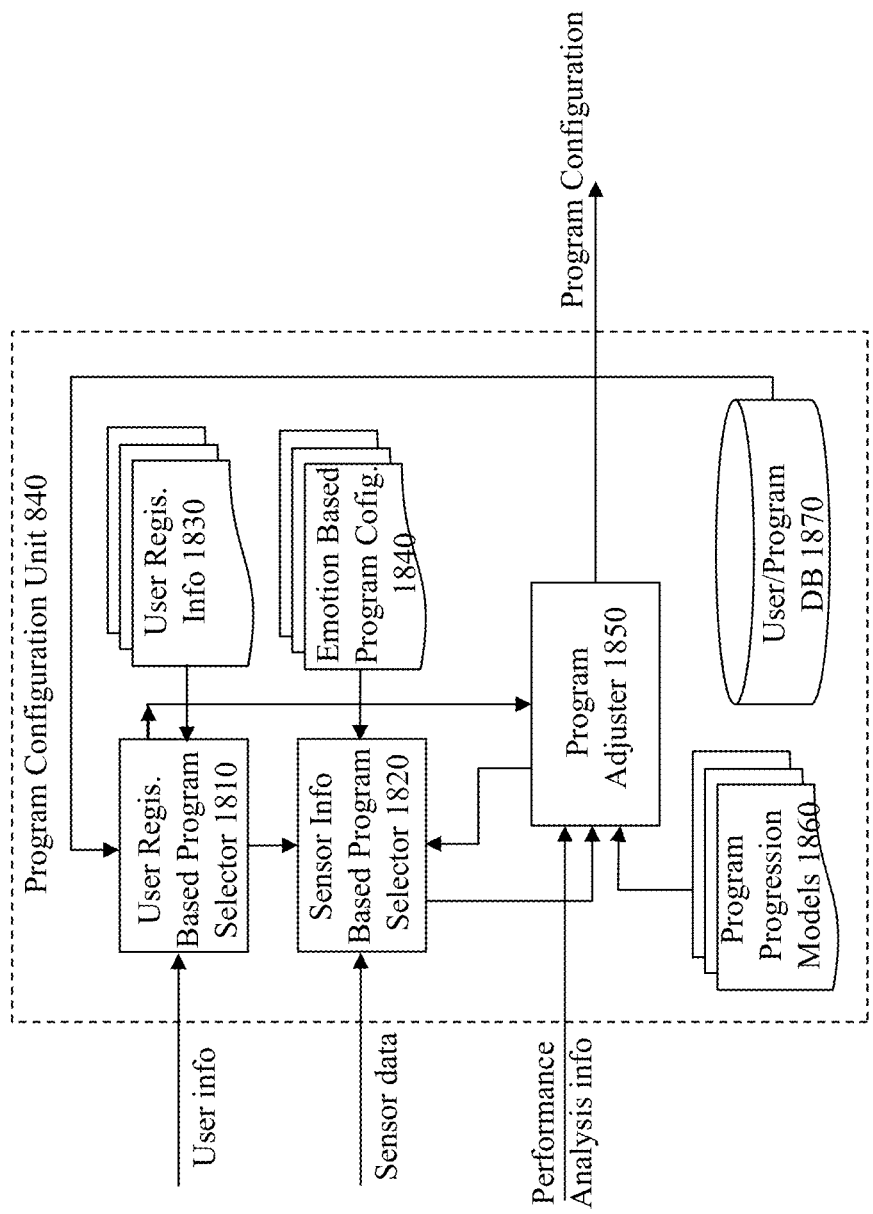
FIG. 18A depicts an exemplary high level system diagram of a program configuration unit, according to an embodiment of the present teaching.

FIG. 18A depicts an exemplary high level system diagram of the program configuration unit 840, according to an embodiment of the present teaching. In this illustrated embodiment, the program configuration unit 840 comprises a user registration based program selector 1810, a sensor info based program selector 1820, and a program adjuster 1850. The user registration based program selector selects a program based on user's registration status. If a user is a registered user, it may select a program from a user/program database 1870. If a user is not registered, it may select a special program for a new user. The sensor information based program selector 1820 is configured to select a program adaptively based on what is observed of the user and the surrounding. The program adjuster 1850 is configured for making a final selection or determination as to what the program is based on one or two selections from selectors 1810 and 1820.

Figure 18B:
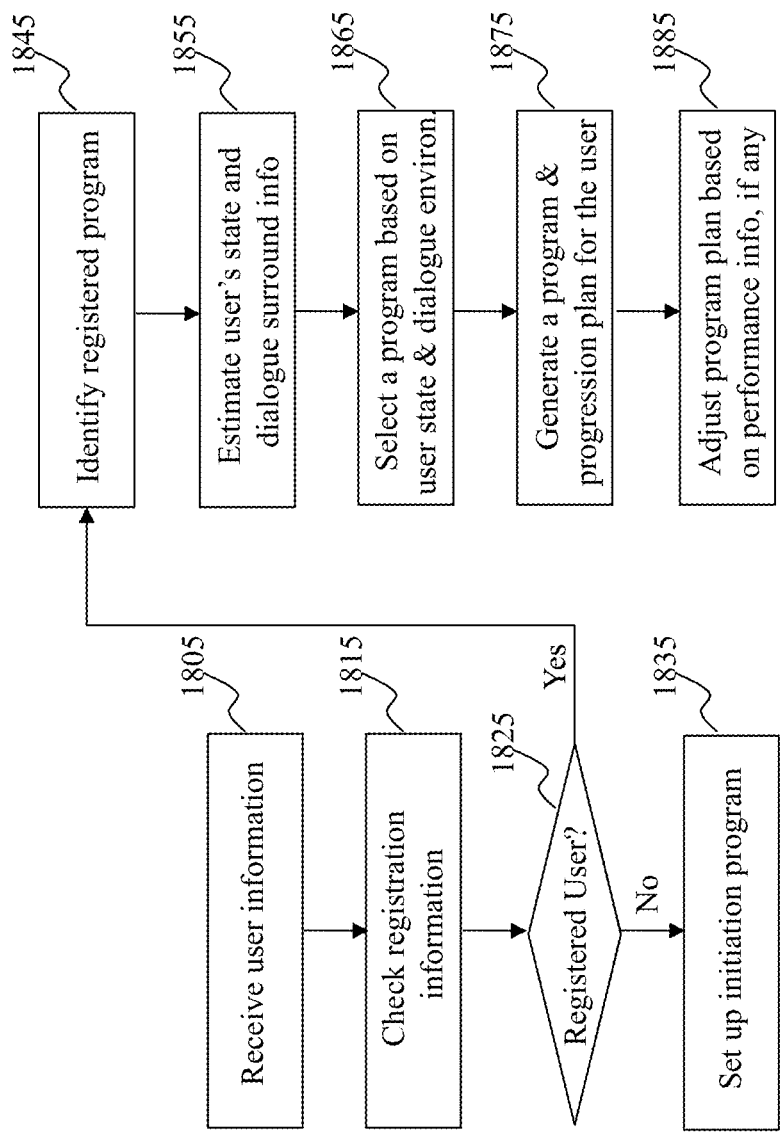
FIG. 18B is a flowchart of an exemplary process of a program configuration unit, according to an embodiment of the present teaching.

FIG. 18B is a flowchart of an exemplary process of the program configuration unit 840, according to an embodiment of the present teaching. In operation, upon receiving user information at 1805, the user registration based program selector 1810 checks, at 1815, whether the user is a pre-registered user. If the user is not a pre-registered user, determined at 1825, an initiation program is configured to start the conversation. As discussed herein, such an initiation program may be designed to ask various questions to the user in order to achieve certain purposes, e.g., get the user to sign up a program.

If the user is a registered user, which may be verified from user registration information storage 1830, the user registration based program selector may access information stored in the user/program database 1870 to identify, at 1845, a program that the user has signed up for. This yields a selected program that is based on user's registered program. As shown in FIG. 18A, the program configuration unit 840 also determines a program adaptively that is considered suitable for the user at the time based on observation of the user state and/or the surrounding of the dialogue environment. To do that, the sensor info based program selector 1820 estimates, at 1855, the user state and the dialogue environment based on multimodal sensor data acquired by the user device and/or the agent device. Based on the estimated user state and/or dialogue environment, the sensor info based program selector 1820 adaptively selects, at 1865, a program. As discussed herein, such a program selected based on estimated user state and/or surround information may be a task oriented program or a non-task oriented program (e.g., when the user is observed not up to it). If it is a task oriented program, is may be consistent with the program selected based on the user registration information. If it is not a task oriented program (e.g., the sensor info based program selector 1820 determines to talk about a duck toy in the scene in order to cheer up the user to continue to engage the user), the program or topic selected by the sensor info based program selector 1820 may differ from that selected based on registration. In this case, the difference may be resolved by the program adjuster 1850.

Once the selectors 1810 and 1820 make respective selection on a program, the program adjuster 1850 may then generate, at 1875, a final program selection based on a progression plan to be used by the automated dialogue companion to conduct the dialogue. In some embodiments, the program adjuster 1850 may rely on program progression models 1860 to integrate or resolve the difference in selected programs from selectors 1810 and 1820. When the selections from selectors 1810 and 1820 are consistent (or the same), the program adjuster 1850 may not need to reconcile any difference. When there are different selections, the program adjuster 1850 may need to resolve the difference. In some embodiments, the program progression models 1860 may be used to resolve such differences. The models 1860 may correspond to rules, e.g., specifying priorities between different selected programs. For instance, it may be specified that a selection from selector 1820 has a higher priority than the selection from selector 1810. This may be based on that selector 1820 considers the dynamics of the user and the environment while selector 1810 does not. In some embodiments, such priority setting may also depend on some estimated confidence associated with the selection obtained by selector 1820. The program progression models 1860 may specify that selection from 1820 take a higher priority when the confidence in estimated user state is above a certain level. If the confidence is below a certain level, the program progression models 1860 may specify that the program adjuster 1850 may proceed with the selection made based on registration.

In some embodiments, the program adjuster 1850 may combine different selections instead of taking one over the other. The scheme of combining the two selected programs may also be specified in the program progression models 1860. For instance, in the event that the confidence of the selection from 1820 is not of a required level, the program progression models 1860 may specify to integrate the two programs by, e.g., interleaving content from each program based on a time schedule. For example, each of the two programs may alternately progress for a respectively specified period of time (e.g., 15 minutes for the first program and 5 minutes for the second). If the user registration based selection is on $5^{th}$ grade math and the sensor info based selection is to talk about Lego game, this combined program will allow the automated dialogue companion to test the user and then based on the performance observed to make future adjustment. This may provide a grace period for observation of user performance before committing to a specific program.

The program adjuster 1850 may also be configured to adaptively adjust, at 1885, the program based on observation made with respect to the performance during the dialogue. As discussed herein, the interaction information of the dialogue is continuously monitored (see FIG. 8), analyzed by the interaction analyzer 855, and performance of the user is assessed by the performance assessment unit 860. The performance assessment information is sent to the program configuration unit 840 and used by the program adjuster 1850 to determine how to adapt the program to the situation observed. In some embodiments, when the performance satisfies a certain condition (e.g., performance is too low), the program adjuster 1850 may trigger the sensor info based program selector 1820 to analyze the continually collected sensor information to understand the dynamic user state and surrounding and select a program according to the observed situation. For example, if the user appears to be frustrated and not performing well, the sensor info based program selector 1820 may switch out the current program and select a temporary program, e.g., that may introduce distraction or talk about something the user is interested in, to continue to engage the user. Such a newly selected program may then be sent to the program adjuster 1850, which may then adjust the program based on the program progression model 1860. In this manner, the program used to drive the dialogue with a user can be adaptively adjusted in order to enhance user experience and engagement.

Figure 19A:
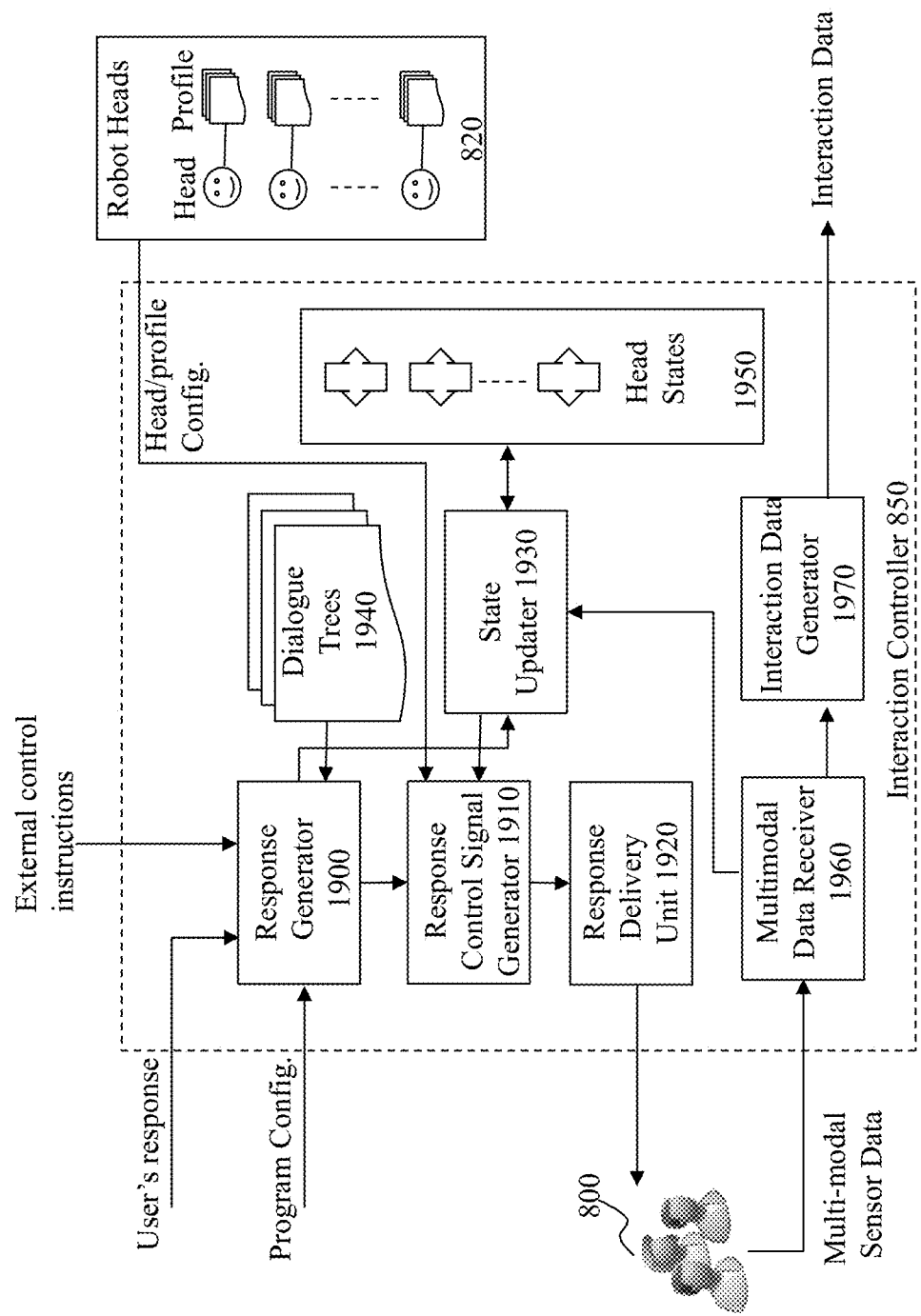
FIG. 19A depicts an exemplary high level system diagram of an interaction controller, according to an embodiment of the present teaching.

As seen in FIG. 8, once a profile and a program are both configured for a selected robot head by the profile configuration unit 830 and the program configuration unit 840, respectively, the interaction controller 850 then proceeds to control the dialogue between the agent device and the user. During the dialogue, the interaction controller 850 uses the configured program to drive the conversation and then control the selected robot head to deliver each response in the dialogue in a manner dictated by the configured profile. FIG. 19A depicts an exemplary high level system diagram of the interaction controller 850, according to an embodiment of the present teaching. In this illustrated embodiment, the interaction controller 850 comprises a response generator 1900, a response control signal generator 1910, a response delivery unit 1920, a state updater 1930, a multimodal data receiver 1960, and an interaction data generator 1970. These components work in concert to control the communication with the user based on the configured program and profile. The interaction controller 850 may also control the transition of the state of the robot head in accordance with the progression of the dialogue.

Figure 19B:
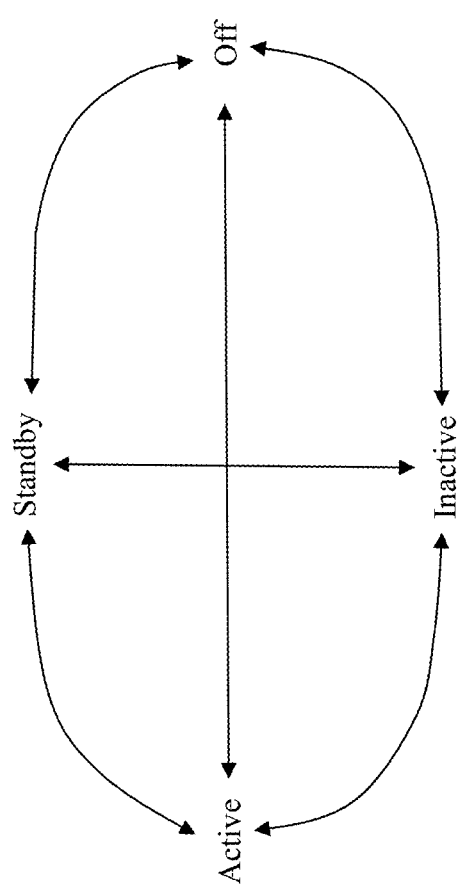
FIG. 19B illustrates an exemplary robot state transition diagram, according to an embodiment of the present teaching.

FIG. 19B illustrates an exemplary robot state transition diagram, according to an embodiment of the present teaching. In this illustrated transition diagram, a robot may operate in four different states, e.g., an off state, an active state, a standby state, and an inactive state. When an agent device (or robot) is in an off state, it may indicate that the agent device is not turned on. When an agent device is in an active state, it may be actively engaged in an on-going dialogue. When an agent device is in a standby state, it may mean that the agent device has is not actively engaged in a dialogue but still involved in the dialogue and waiting for a response from the user. When an agent device is in an inactive state, it may indicate that the agent device is on but currently not engaged in a dialogue.

Transitions among different states may be bi-directional and transition in any direction between two states may be enabled. A transition between two states in a certain direction may be conditioned, depending on application needs. For example, to transit from the inactive state to a standby state may be triggered when a user is detected in the vicinity. To transit from the standby state to the active state may be conditioned on the completion of robot head selection, profile/program configuration for a user who is nearby. Transition from the active state to the standby state may be carried out when a user does not respond to a question asked by the agent device for a specified period of time or when the user is detected to have left the area. In the standby state, the agent device may still be in a setting where it keeps track of all the information related to the on-going dialogue so that when the user responds or returns, the agent device can quickly pick up from where the dialogue was left off and continue.

The transition from the standby state to the inactive state may require different condition(s) to be met if the agent device in the inactive state may become disengaged in the dialogue that led to the transition. For example, if a user has not responded to anything agent device said to him/her for an extended period (e.g., 0.5 hour), the agent device may be put to the inactive state in which the agent device is not engaged in any dialogue and does not retain any information from prior dialogues. In some sense, an agent device in the inactive state may be in a sleep mode. In some situations, the agent device may be put into an off state from any of the other three states, e.g., when the power switch of the agent device is turned off (manually or electronically).

Figure 19C:
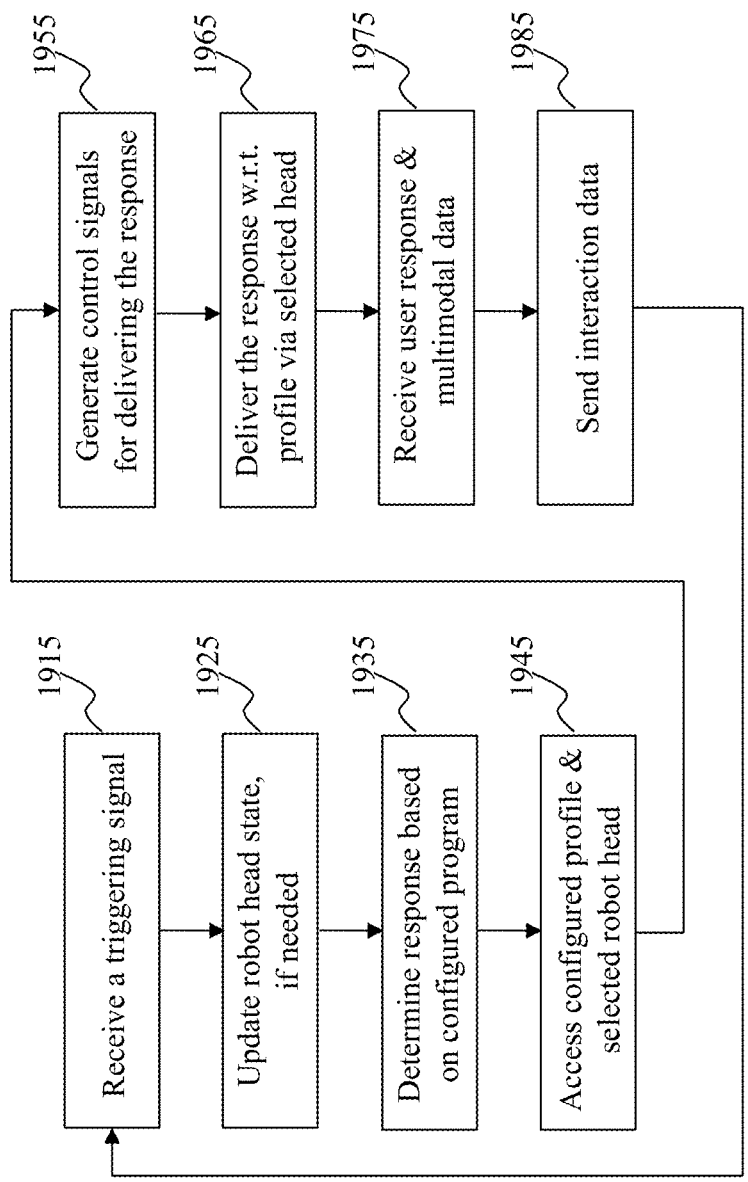
FIG. 19C is a flowchart of an exemplary process of an interaction controller, according to an embodiment of the present teaching.

FIG. 19C is a flowchart of an exemplary process of the interaction controller 850, according to an embodiment of the present teaching. In operation, the dialogue is triggered either by a detection of a user in the vicinity or by a response from a user in an on-going dialogue. Such a triggering signal may cause the interaction controller 850 to proceed to its operation as follows. Upon receiving a triggering signal at 1915, the response generator 1910 may proceed, depending on the on-going dialogue state, to invoke the state updater 1930 to carry out a state transition, if warranted, of the agent device. As shown, each of the selectable robot head is associated with a current state and stored in an archive 1950. If the triggering signal is an external control instruction, e.g., sent from the presence detector 805 (see FIG. 8) when a user is detected in the nearby area, the state updater 1930 may update, at 1925, the state of the robot head selected for the user, e.g., from the inactive state to the standby state (or active state). If the triggering signal is based on a user's response, depending on the current state of the agent device (or robot head), state transition may not be needed. For instance, if the agent device is already in the active state and then receives a user's response, no state transition is needed in this case.

Whether triggered by an external control signal or a user's response, the response generator 1910 may also proceed to determine, at 1935, an agent's response based on the configured program (the program dictates how the conversation flows). Such an agent's response may be either an initiation greeting to be said to the user when the agent device is to initiate the dialogue or a response to what the user just uttered (user's response). The generated agent's response may involve actions in one or more modalities. In some embodiments, the agent's response may be a simple "oral" response to be carried out via, e.g., text to speech. In some embodiments, an oral response may be carried out in conjunction with an expression, which may be delivered via facial feature manipulation (e.g., render a big smile on face) and/or via some physical movements of certain parts of the agent device (e.g., wave an arm to express, e.g., excitement).

To control the agent device (or the selected robot head) to deliver the generated agent's response in accordance with the configured profile, the response generator 1910 invokes the response control signal generator 1910, which accesses, at 1945, information about the robot head selected to converse with the user and its associated profile that dictates the way to "talk" to the user. As discussed herein, the configured profile may specify parameters that are to be used to control how speech will be delivered (soothing voice, British accent, low pitch, slower talking speed, etc.) or what expressions that the agent device may be rendered with (e.g., how to render the facial expression of the agent device on a display screen located at the face portion of the agent device). Based on the configured profile, the response control signal generator 1910 may then generate, at 1955, appropriate control signals that are to be used to implement the profiled characteristics on the agent device. For example, to control the robot head to speak slowly, the control signals may include parameters to be used to control how to convert text (the response to be uttered) into speech in a required speed. To control the agent device to have a smiling face, the control signals may include parameters to be used to render a smile (e.g., curved eyes) on the agent's "face."

The control signals generated by the response control signal generator 1910 may then be used by the response delivery unit 1920 to deliver, at 1965, the response to the user in one or more modalities based on the control signals, as discussed herein. After the response is delivered, the multimodal data receiver 1960 receives, at 1975, feedback(s) from the user's site. Such feedback may include information in one or more modalities, e.g., audio, visual, textual, or even haptic. Such multimodal data may be acquired by sensors deployed either on the user device or on the agent device. To allow the automated dialogue companion to be adaptive, such received multimodal data acquired during the dialogue is sent to the interaction data generator 1970, which then generates data related to the interactions between the user and the agent device and sends, at 1985, to the interaction analyzer 855 (see FIG. 8). As discussed herein, the interaction analyzer 855 and the performance assessment unit 860 may then evaluate, based on the real-time acquired sensor data in one or more modalities, the performance of the user based on the interaction feedback and subsequently enable adaptive adjustment of profile and/or program via the profile configuration unit 830 and the program configuration unit 840.

Figure 20A:
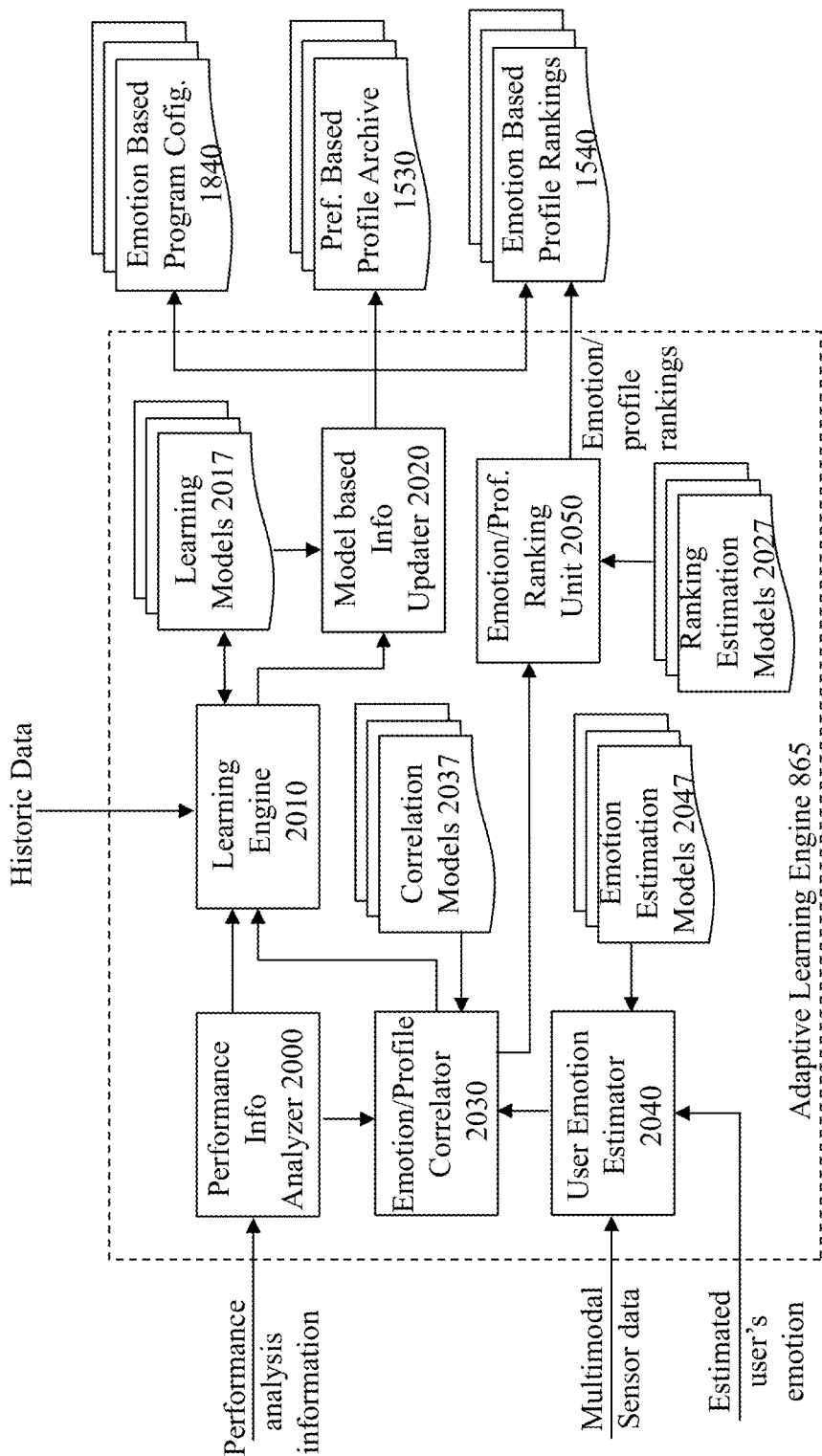
FIG. 20A depicts an exemplary high level system diagram of an adaptive learning engine, according to an embodiment of the present teaching.
Figure 20B:
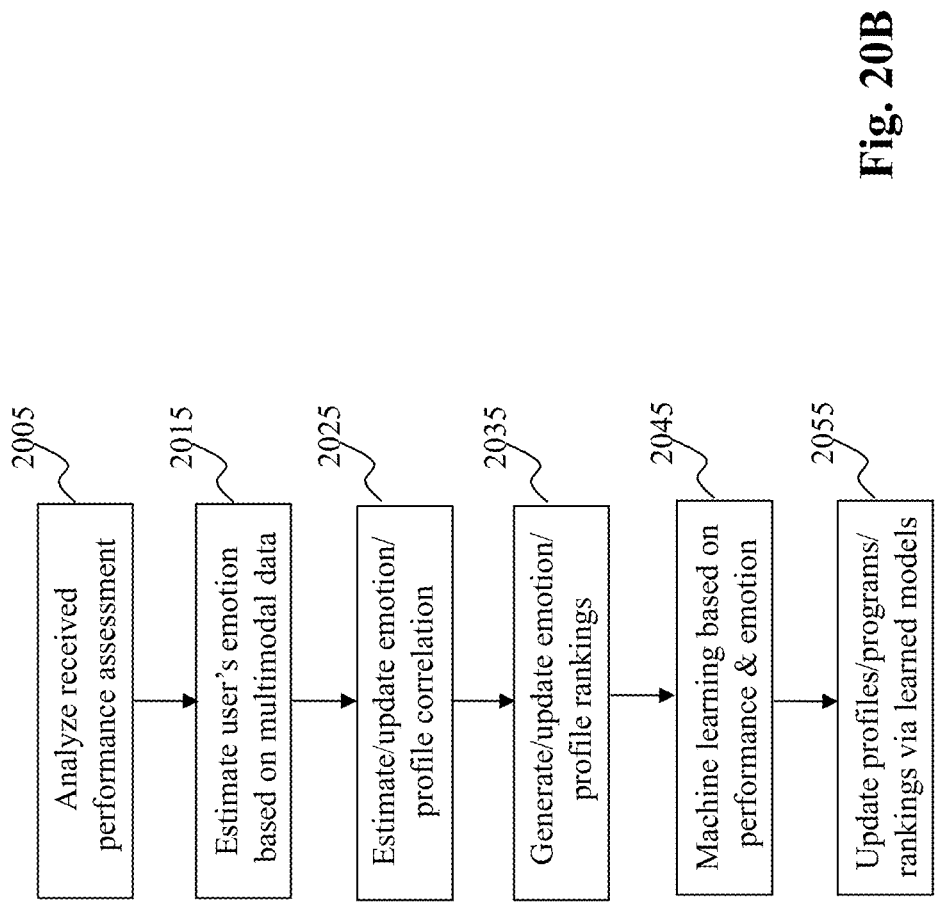
FIG. 20B is a flowchart of an exemplary process of an adaptive learning engine, according to an embodiment of the present teaching.

In facilitating the adaptive behavior of the automated dialogue companion, the adaptive learning engine 865 (see FIG. 8) may learned from interactions and the performance thereof to enable adaptive adjustment of configuring profile/program for the purpose of, e.g., improving engagement and user experience. FIG. 20A depicts an exemplary high level system diagram of the adaptive learning engine 865, according to an embodiment of the present teaching. In this illustrated embodiment, the adaptive learning engine 865 comprises a performance info analyzer 2000, a user emotion estimator 2040, an emotion/profile correlator 2030, a learning engine 2010, a profile/program updater 2020, and an emotion/profile ranking unit 2050. FIG. 20B is a flowchart of an exemplary process of the adaptive learning engine 865, according to an embodiment of the present teaching.

In operation, the adaptive learning engine 865 receives data related to interactions between users and the automated dialogue companion. Such data may be acquired in real-time during each on-going dialogue and represent the quality, performance, and consequence of different human machine interactions, which may be used to learn how to improve future human machine interactions. The learned experience, which may be represented by adaptively updated models, may then be used to adaptively adjust various configurable parameters that may be applied during human machine interactions. For instance, such configurable parameters may be related to how to select selectable robot heads (e.g., what type of scenarios may use what types of robot head to improve user experience), the correlation between user emotions and profiles suitable for such emotions (e.g., what voice is better for certain users who are in a certain emotional state), how programs may be alternately progressed in order to enhance the performance in certain situations, etc.

In the exemplary flow depicted in FIG. 20B, when the performance info analyzer 2000 receives the performance assessment result (e.g., from the performance assessment unit 860 in FIG. 8), it analyzes, at 2005, the received information. When the user emotion estimator 2040 receives multimodal sensor data acquired at the dialogue scene (related to the user and/or the dialogue scene), it estimates, at 2015, the present user's emotion based on, e.g., multimodal sensor data acquired from the dialogue scene and certain emotion estimation models 2047. In some embodiments, the user emotion estimator 2040 may also receive estimated user emotion, e.g., estimated by the interaction analyzer 855 (see FIG. 8). The analyzed performance information (by the performance info analyzer 2000) and the estimated user's emotion (by either the user emotion estimator 2040 or by the interaction analyzer 855) may then be sent to the emotion/profile correlator 2030 for updating the emotion/profile correlation.

As discussed herein, profiles may be classified into different groups, each of which may be correlated with a certain emotion. The profiles in the same group associated with an emotion may correspond to profiles that may be effective when used in communicating with a user in that emotional state and each profile in the group for that emotion may have an associated ranking, which may represent a quantifies measure to say how effective that this profile when applied in dealing with a user in that emotional state. So, the emotion/profile correlation is an indicator which may be used to select a profile given an estimated user/s emotional state.

Observed performance of a user during a dialogue may be indicative of the effectiveness of the profile currently being applied in the dialogue with respect to the emotional state of the user. Thus, the performance information acquired during a dialogue in which a particular profile is used to address a specific emotional state of the user may be used to dynamically assess the effectiveness of the profile with respect to the emotional state of the user. Such assessment of the effectiveness of a profile with respect to an emotion may then be used to update adaptively the ranking of the correlation between the profile and the emotion at issue.

As such, upon receiving the performance analysis result (from 2000) achieved by applying a profile in a dialogue with a user with the estimated user's emotion (from 2040), the emotion/profile correlator 2030 may estimate, at 2025, the correlation between the profile used and the emotion state of the user based on, e.g., some correlation models 2037 as shown in FIG. 20A. Such estimated correlation may then be used to determining a ranking, at 2035 by the emotion/profile ranking unit 2050, with respect to the pairing of the profile and the emotion. As discussed herein, a ranking for a pair of a profile and an emotion indicates how suitable the profile is when it is used by an agent device to interface with a user in that emotional state. Thus, the higher the degree of correlation, the estimated ranking may be higher. The emotion/profile ranking unit 2050 may base its estimation based on ranking estimation models 2027. In some situations, a pair of a profile and an emotion may already exist with a previously estimated ranking score. In this case, the continually collected performance data and emotional state of the user may be used to adaptively update, at 2025, the ranking of the pairing between the profile and the emotion. As discussed previously, such emotion/profile ranking may be used in selecting an appropriate profile to be used to configure an agent device.

In addition to estimating the correlation and the rankings of profiles with respect to emotions, the dynamically collected information (including performance information as well as multimodal sensor data) may also be used by the learning engine 2010 to learn or update, at 2045, e.g., various models 2017. Based on the adaptively learned models 2017, the model based information updater 2020 may then update, at 2055, various configuration information that are relied on by profile configuration unit 830 and program configuration unit 840 to configure an agent device. For example, based on learned models 2017, the emotion based program configuration 1840, the preference based profile archive 1530, and the emotion/profile ranking 1540 may be adaptively adjusted.

Figure 21:
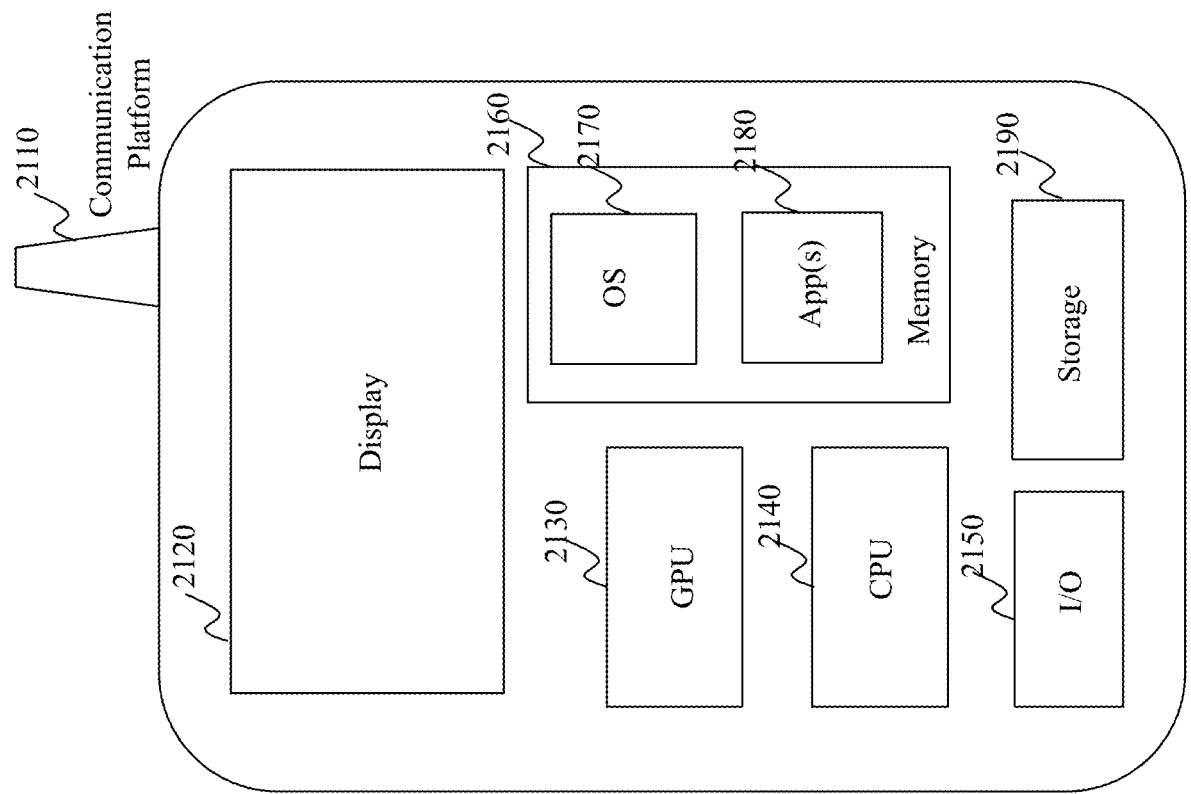
FIG. 21 depicts the architecture of a mobile device which can be used to implement a specialized system incorporating the present teaching.

FIG. 21 depicts the architecture of a mobile device which can be used to realize a specialized system, either partially or fully, implementing the present teaching. In this example, the user device on which content and advertisement are presented and interacted-with is a mobile device 2100, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 2100 in this example includes one or more central processing units (CPUs) 2140, one or more graphic processing units (GPUs) 2130, a display 2120, a memory 2160, a communication platform 2110, such as a wireless communication module, storage 2190, and one or more input/output (I/O) devices 2150. Any other suitable component, including but not limited to a system bus or a controller (not shown), may also be included in the mobile device 1200. As shown in FIG. 21, a mobile operating system 2170, e.g., iOS, Android, Windows Phone, etc., and one or more applications 2180 may be loaded into the memory 2160 from the storage 2190 in order to be executed by the CPU 2140. The applications 2180 may include a browser or any other suitable mobile apps for receiving and rendering content streams and advertisements on the mobile device 2100. Communications with the mobile device 2100 may be achieved via the I/O devices 2150.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to query to ads matching as disclosed herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 22:
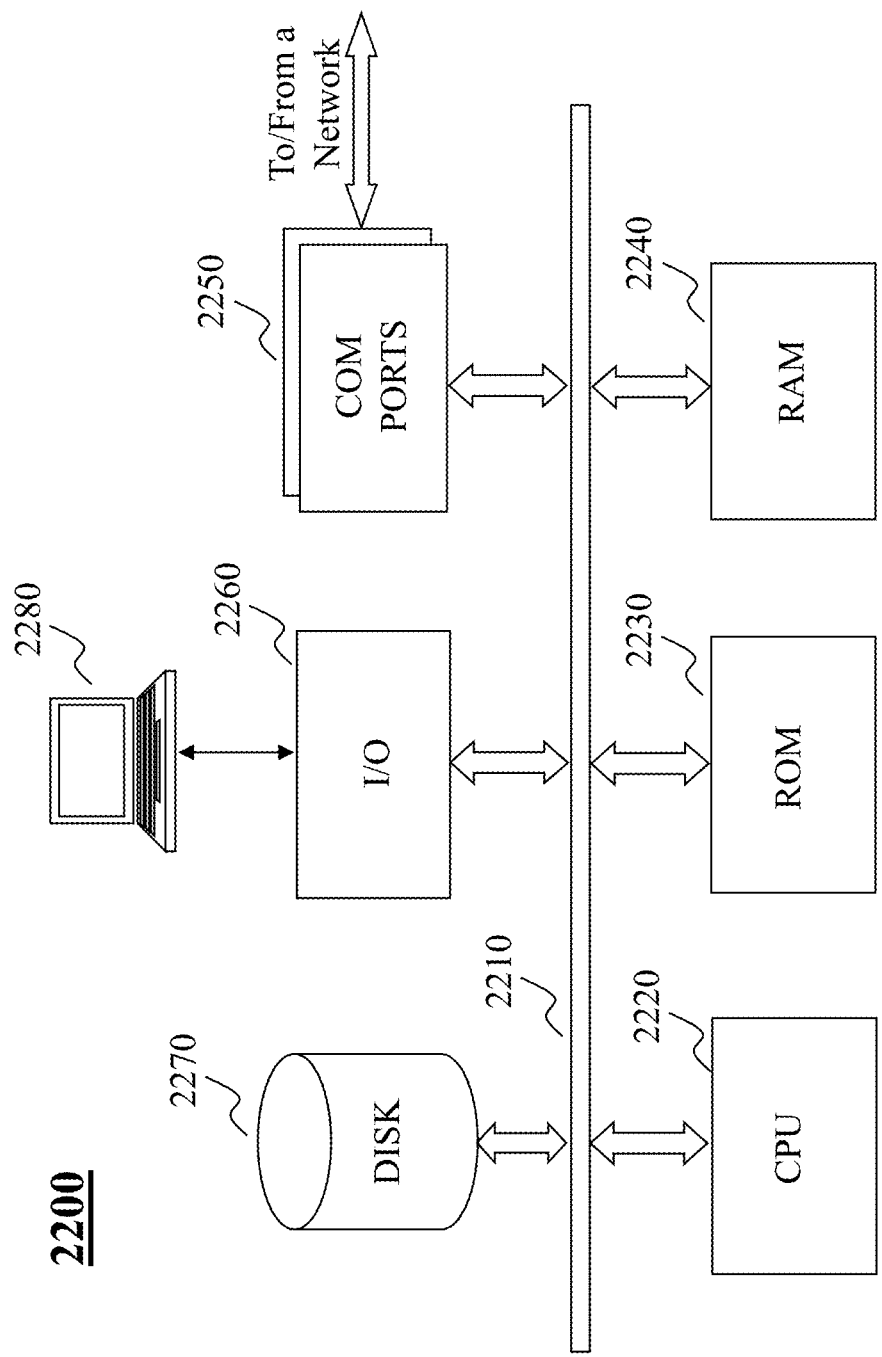
FIG. 22 depicts the architecture of a computer which can be used to implement a specialized system incorporating the present teaching.

FIG. 22 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 2200 may be used to implement any component of the present teaching, as described herein. For example, the emotion-based ad selection engine 2270 may be implemented on a computer such as computer 2200, via its hardware, software program, firmware, or a combination thereof. Although only one such computer is shown, for convenience, the computer functions relating to the present teaching as described herein may be implemented in a distributed fashion on a number of similar platforms, to distribute the processing load.

The computer 2200, for example, includes COM ports 2250 connected to and from a network connected thereto to facilitate data communications. The computer 2200 also includes a central processing unit (CPU) 2220, in the form of one or more processors, for executing program instructions. The exemplary computer platform includes an internal communication bus 2210, program storage and data storage of different forms, e.g., disk 2270, read only memory (ROM) 2230, or random access memory (RAM) 2240, for various data files to be processed and/or communicated by the computer, as well as possibly program instructions to be executed by the CPU. The computer 2200 also includes an I/O component 2260, supporting input/output flows between the computer and other components therein such as user interface elements 2280. The computer 2200 may also receive programming and data via network communications.

Hence, aspects of the methods of enhancing ad serving and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other systems into the hardware platform(s) of a computing environment or other system implementing a computing environment or similar functionalities in connection with query/ads matching. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the enhanced ad serving based on user curated native ads as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method, implemented on a machine having at least one processor, storage, and a communication platform capable of connecting to a network for configuring an animatronic device, comprising:
    obtaining information about a user for whom an animatronic device is to be configured to carry out a human machine dialogue on a topic with an intended goal with the user; and
    identifying one or more preferences of the user from the obtained information;
    selecting, from a plurality of selectable profiles, a first selected profile based on the one or more preferences, wherein the first selected profile specifies parameters to be used to control a manner by which the animatronic device carries out the dialogue on the topic with the user;
    configuring, dynamically, the animatronic device with an integrated profile determined based on the first selected profile and performance of the user on the topic for carrying out the dialogue in a manner dictated by the integrated profile.

2. The method of claim 1, wherein each of the plurality of selectable profiles is associated with at least one of a character and a certain persona, wherein a character includes a human and a non-human.

3. The method of claim 2, wherein the persona associated with each of the plurality of selectable profiles is to be projected by the animatronic device to the user via at least one of voice, facial expression, and speech style.

4. The method of claim 3, wherein
    a voice specified corresponds to one of a boy, a girl, a woman, and a man;
    a speech style is determined based on at least some of a language, a speed, a tone, and a pitch of the speech during the dialogue.

5. The method of claim 1, further comprising selecting, from the plurality of selectable profiles, a second selected profile based on a state of the user detected based on sensor data.

6. The method of claim 5, wherein the state of the user includes at least one of:
   an expression of the user;
   an emotion of the user estimated based on the expression of the user and the sensor data;
   an utterance from the user; and
   an intent of the user estimated based on the emotion and the utterance of the user.

7. The method of claim 5, wherein the step of configuring the animatronic device comprises:
   receiving profile/emotion rankings associated with the first and second selected profiles, wherein the profile/emotion rankings are learned based on the performance; and
   determining the integrated profile based on combining the first and second selected profiles in accordance with the performance assessed with respect to the intended goal.

8. Machine readable and non-transitory medium having information recorded thereon for configuring an animatronic device, wherein the information, when read by the machine, causes the machine to perform the following:
   obtaining information about a user for whom an animatronic device is to be configured to carry out a human machine dialogue on a topic with an intended goal with the user; and
   identifying one or more preferences of the user from the obtained information;
   selecting, from a plurality of selectable profiles, a first selected profile based on the one or more preferences, wherein the first selected profile specifies parameters to be used to control a manner by which the animatronic device carries out the dialogue on the topic with the user;
   configuring, dynamically, the animatronic device with an integrated profile determined based on the first selected profile and performance of the user on the topic for carrying out the dialogue in a manner dictated by the integrated profile.

9. The medium of claim 8, wherein each of the plurality of selectable profiles is associated with at least one of a character and a certain persona, wherein a character includes a human and a non-human.

10. The medium of claim 9, wherein the persona associated with each of the plurality of selectable profiles is to be projected by the animatronic device to the user via at least one of voice, facial expression, and speech style.

11. The medium of claim 10, wherein
   a voice specified corresponds to one of a boy, a girl, a woman, and a man;
   a speech style is determined based on at least some of a language, a speed, a tone, and a pitch of the speech during the dialogue.

12. The medium of claim 8, wherein the information, when read by the machine, further causes the machine to perform selecting, from the plurality of selectable profiles, a second selected profile based on a state of the user detected based on sensor data.

13. The medium of claim 12, wherein the state of the user includes at least one of:
   an expression of the user;
   an emotion of the user estimated based on the expression of the user and the sensor data;
   an utterance from the user; and
   an intent of the user estimated based on the emotion and the utterance of the user.

14. The medium of claim 12, wherein the step of configuring the animatronic device comprises:
   receiving profile/emotion rankings associated with the first and second selected profiles, wherein the profile/emotion rankings are learned based on the performance; and
   determining the integrated profile based on the first and second selected profiles in accordance with the performance assessed with respect to the intended goal.

15. A system for configuring an animatronic device, comprising:
   a user information based profile selector configured for
      obtaining information about a user for whom an animatronic device is to be configured to carry out a human machine dialogue on a topic with an intended goal with the user,
      identifying one or more preferences of the user from the obtained information, and
      selecting, from a plurality of selectable profiles, a first selected profile based on the one or more preferences, wherein the first selected profile specifies parameters to be used to control a manner by which the animatronic device carries out the dialogue on the topic with the user; and
   a profile configuration integrator configured for configuring, dynamically, the animatronic device with an integrated profile determined based on the first selected profile and performance of the user on the topic for carrying out the dialogue in a manner dictated by the integrated profile.

16. The system of claim 15, wherein each of the plurality of selectable profiles is associated with at least one of a character and a certain persona, wherein a character includes a human and a non-human.

17. The system of claim 16, wherein the persona associated with each of the plurality of selectable profiles is to be projected by the animatronic device to the user via at least one of voice, facial expression, and speech style.

18. The system of claim 17, wherein
   a voice specified corresponds to one of a boy, a girl, a woman, and a man;
   a speech style is determined based on at least some of a language, a speed, a tone, and a pitch of the speech during the dialogue.

19. The system of claim 15, further comprising a sensor information based profile selector configured for selecting, from the plurality of selectable profiles, a second selected profile based on a state of the user detected based on sensor data.

20. The system of claim 19, wherein the state of the user includes at least one of:
   an expression of the user;
   an emotion of the user estimated based on the expression of the user and the sensor data;
   an utterance from the user; and
   an intent of the user estimated based on the emotion and the utterance of the user.

21. The system of claim 19, wherein the profile configuration integrator configures the animatronic device by:
   receiving profile/emotion rankings associated with the first and second selected profiles, wherein the profile/emotion rankings are learned based on the performance; and determining the integrated profile based on the first and second selected profiles in accordance with the performance assessed with respect to the intended goal.

\* \* \* \* \*